(12) United States Patent
Wu et al.

(10) Patent No.: US 8,488,694 B2
(45) Date of Patent: Jul. 16, 2013

(54) SYSTEM AND METHOD FOR PILOT DESIGN

(75) Inventors: Jia-Hao Wu, Gueishan Township (TW); Lai-Huei Wang, Bade (TW); Yu-Tao Hsieh, Hsinchu (TW); Pang-An Ting, Fongyuan (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1114 days.

(21) Appl. No.: 12/431,046

(22) Filed: Apr. 28, 2009

(65) Prior Publication Data

US 2009/0279623 A1 Nov. 12, 2009

Related U.S. Application Data

(60) Provisional application No. 61/050,977, filed on May 6, 2008, provisional application No. 61/079,986, filed on Jul. 11, 2008, provisional application No. 61/093,520, filed on Sep. 2, 2008.

(51) Int. Cl.
*H04J 11/00* (2006.01)

(52) U.S. Cl.
USPC ........... 375/260; 375/299; 375/259; 375/295; 375/267

(58) Field of Classification Search
USPC ................ 375/260, 299, 259, 295, 267
See application file for complete search history.

(56) References Cited

U.S. PATENT DOCUMENTS

| | | | |
|---|---|---|---|
| 7,920,598 B2 * | 4/2011 | Luo | 370/509 |
| 7,929,417 B2 * | 4/2011 | Jung et al. | 370/210 |
| 8,111,763 B2 * | 2/2012 | Ma et al. | 375/260 |
| 8,174,957 B2 * | 5/2012 | Ko et al. | 370/208 |
| 2005/0286408 A1 * | 12/2005 | Jin et al. | 370/208 |
| 2007/0053282 A1 | 3/2007 | Tong et al. | |
| 2007/0195899 A1 * | 8/2007 | Bhushan et al. | 375/260 |
| 2008/0123592 A1 | 5/2008 | Popovic | |
| 2008/0165891 A1 * | 7/2008 | Budianu et al. | 375/299 |
| 2009/0067534 A1 * | 3/2009 | Kwak et al. | 375/267 |
| 2009/0257520 A1 * | 10/2009 | Lin et al. | 375/260 |
| 2010/0278221 A1 * | 11/2010 | Qi et al. | 375/219 |

FOREIGN PATENT DOCUMENTS

WO WO 2006/102771 10/2006

OTHER PUBLICATIONS

Office Action for Application No. 200910137885.9, from the Chinese Patent Office, dated Jul. 4, 2011.

* cited by examiner

*Primary Examiner* — Siu Lee
(74) *Attorney, Agent, or Firm* — McClure, Qualey & Rodack, LLP

(57) ABSTRACT

A method for generating a pilot pattern for data to be transmitted in an orthogonal frequency-division multiplexing (OFDM) based communication system includes: allocating pilot symbols for a plurality of data streams to form a plurality of pilot clusters in the pilot pattern, wherein each of the pilot clusters includes ones of the pilot symbols, the ones of the pilot symbols being for respectively different ones of the data streams.

26 Claims, 43 Drawing Sheets

| | Time → | | | | | |
|---|---|---|---|---|---|---|
| | D | D | D | D | D | D |
| | P1 | P3 | D | D | P1 | P3 |
| | P2 | P4 | D | D | P2 | P4 |
| Frequency ↓ | D | D | D | D | D | D |
| | D | D | D | D | D | D |
| | D | D | D | D | D | D |
| | D | D | D | D | D | D |
| | D | D | D | D | D | D |
| | D | D | D | D | D | D |
| | P1 | P3 | D | D | P1 | P3 |
| | P2 | P4 | D | D | P2 | P4 |
| | D | D | D | D | D | D |

Time →

Frequency ↓

| P1 | P3 | D  | D  | D  | D  |
|----|----|----|----|----|----|
| P2 | P4 | D  | D  | D  | D  |
| D  | D  | D  | D  | D  | D  |
| D  | D  | D  | D  | D  | D  |
| D  | D  | D  | D  | D  | D  |
| D  | D  | D  | D  | P1 | P3 |
| D  | D  | D  | D  | P2 | P4 |
| D  | D  | D  | D  | D  | D  |
| D  | D  | D  | D  | D  | D  |
| D  | D  | D  | D  | D  | D  |
| D  | D  | D  | D  | D  | D  |
| P1 | P3 | D  | D  | D  | D  |
| P2 | P4 | D  | D  | D  | D  |
| D  | D  | D  | D  | D  | D  |
| D  | D  | D  | D  | D  | D  |
| D  | D  | D  | D  | D  | D  |
| D  | D  | D  | D  | P1 | P3 |
| D  | D  | D  | D  | P2 | P4 |

Time →

Frequency ↓

| P1 | P3 | D  | D  | D  | D  |
|----|----|----|----|----|----|
| D  | D  | D  | D  | P2 | P4 |
| D  | D  | D  | D  | D  | D  |
| D  | D  | D  | D  | D  | D  |
| D  | D  | D  | D  | D  | D  |
| D  | D  | D  | D  | P1 | P3 |
| P2 | P4 | D  | D  | D  | D  |
| D  | D  | D  | D  | D  | D  |
| D  | D  | D  | D  | D  | D  |
| D  | D  | D  | D  | D  | D  |
| D  | D  | D  | D  | D  | D  |
| P1 | P3 | D  | D  | D  | D  |
| D  | D  | D  | D  | P2 | P4 |
| D  | D  | D  | D  | D  | D  |
| D  | D  | D  | D  | D  | D  |
| D  | D  | D  | D  | D  | D  |
| D  | D  | D  | D  | P1 | P3 |
| P2 | P4 | D  | D  | D  | D  |

Time →

Frequency ↓

| P1 | P3 | D | D | D | D |
|----|----|---|---|----|----|
| D | D | D | D | P2 | P4 |
| D | D | D | D | D | D |
| D | D | D | D | D | D |
| D | D | D | D | D | D |
| D | D | D | D | P1 | P3 |
| P2 | P4 | D | D | D | D |
| D | D | D | D | D | D |
| D | D | D | D | D | D |
| D | D | D | D | D | D |
| D | D | D | D | D | D |
| P3 | P1 | D | D | D | D |
| D | D | D | D | P4 | P2 |
| D | D | D | D | D | D |
| D | D | D | D | D | D |
| D | D | D | D | D | D |
| D | D | D | D | P3 | P1 |
| P4 | P2 | D | D | D | D |

Time →

Frequency ↓

| P1 | P3 | D | D | D | D |
|----|----|----|----|----|----|
| P2 | P4 | D | D | D | D |
| D | D | D | D | D | D |
| D | D | D | D | D | D |
| D | D | D | D | P1 | P3 |
| D | D | D | D | P2 | P4 |
| D | D | D | D | D | D |
| D | D | D | D | D | D |
| D | D | D | D | D | D |
| D | D | D | D | D | D |
| D | D | D | D | D | D |
| D | D | D | D | D | D |
| P1 | P2 | D | D | D | D |
| P3 | P4 | D | D | D | D |
| D | D | D | D | D | D |
| D | D | D | D | D | D |
| D | D | D | D | P1 | P3 |
| D | D | D | D | P2 | P4 |

Time →

Frequency ↓

| P1 | P3 | D | D | P2 | P4 |
|----|----|---|---|----|----|
| D  | D  | D | D | D  | D  |
| D  | D  | D | D | D  | D  |
| D  | D  | D | D | D  | D  |
| D  | D  | D | D | D  | D  |
| P2 | P4 | D | D | P1 | P3 |
| D  | D  | D | D | D  | D  |
| D  | D  | D | D | D  | D  |
| D  | D  | D | D | D  | D  |
| D  | D  | D | D | D  | D  |
| D  | D  | D | D | D  | D  |
| D  | D  | D | D | D  | D  |
| P1 | P3 | D | D | P2 | P4 |
| D  | D  | D | D | D  | D  |
| D  | D  | D | D | D  | D  |
| D  | D  | D | D | D  | D  |
| D  | D  | D | D | D  | D  |
| P2 | P4 | D | D | P1 | P3 |

Time →

| P1 | P2 | D  | D  | D  | D  |
|----|----|----|----|----|----|
| D  | D  | D  | D  | P1 | P2 |
| D  | D  | D  | D  | D  | D  |
| D  | D  | D  | D  | D  | D  |
| P2 | P1 | D  | D  | D  | D  |
| D  | D  | D  | D  | P2 | P1 |

Frequency ↓

| P1 | D  | D | D | P1 | D  |
|----|----|---|---|----|----|
| D  | P2 | D | D | D  | P2 |
| D  | D  | D | D | D  | D  |
| D  | D  | D | D | D  | D  |
| P1 | D  | D | D | P1 | D  |
| D  | P2 | D | D | D  | P2 |

Time →

Frequency ↓

| P2 | D | D | D | D | P2 |
|----|---|---|---|---|----|
| P1 | D | D | D | D | P1 |
| D  | D | D | D | D | D  |
| D  | D | D | D | D | D  |
| P2 | D | D | D | D | P2 |
| P1 | D | D | D | D | P1 |

Time →

Frequency ↓

Time →

| D | P2 | D | D | D | D |
| D | P1 | D | D | D | D |
| D | D | D | D | P2 | P1 |
| D | D | D | D | D | D |
| D | D | P1 | D | D | D |
| D | D | P2 | D | D | D |

Frequency ↓

SYSTEM AND METHOD FOR PILOT DESIGN

RELATED APPLICATIONS

This application is based upon and claims the benefit of priority from U.S. Provisional Patent Application No. 61/050,977, filed May 6, 2008, U.S. Provisional Patent Application No. 61/079,986, filed Jul. 11, 2008, and U.S. Provisional Patent Application No. 61/093,520, filed Sep. 2, 2008, the entire contents of which are incorporated herein by reference.

FIELD OF THE INVENTION

This invention relates to systems and methods for pilot design for data to be transmitted in a wireless communication network.

BACKGROUND

Wireless communication techniques based on multiple subcarriers, such as an orthogonal frequency-division multiplexing (OFDM) technique, are gaining worldwide popularity due to their broad applications. For example, an OFDM based communication system may be used in a plurality of networks including Worldwide Interoperability for Microwave Access (WiMax) networks, Wireless Fidelity (Wi-Fi) networks, Wireless Broadband (WiBro) networks, etc.

The OFDM technique uses a plurality of closely-spaced orthogonal subcarriers to carry data. For example, the data may be allocated on a plurality of parallel data channels, one for each of the subcarriers. Each of the subcarriers may be modulated with a conventional modulation scheme, e.g., quadrature amplitude modulation, at a relatively low symbol rate. In addition, based on the OFDM technique, an inverse fast Fourier transform (IFFT) may be performed on OFDM symbols representing the data on a transmitter side of the OFDM based communication system, and a fast Fourier transform (FFT) may be performed to recover the OFDM symbols on a receiver side of the OFDM based communication system. Signals including the OFDM symbols are transmitted from the transmitter side to the receiver side through a communication channel.

In reality, the communication channel may have an effect on the signals when the signals are transmitted. The receiver side may need knowledge of the communication channel to remove such effect, in order to accurately recover the data. To facilitate estimation of the communication channel, signals known to both the transmitter side and the receiver side, i.e., pilot symbols, may be inserted in OFDM symbols on the transmitter side. The receiver side may perform channel estimation based on resource blocks in received signals, and each of the resource blocks includes a plurality of OFDM symbols and, hence, pilot symbols.

For example, the transmitter side may transmit signals including OFDM symbols from multiple transmitting antennas simultaneously, and each of the transmitting antennas transmits one data stream. Multiple receiving antennas on the receiver side each may receive the signals transmitted from the multiple transmitting antennas.

SUMMARY

According to a first aspect of the present disclosure, there is provided a method for generating a pilot pattern for data to be transmitted in an orthogonal frequency-division multiplexing (OFDM) based communication system, the method comprising: allocating pilot symbols for a plurality of data streams to form a plurality of pilot clusters in the pilot pattern, wherein each of the pilot clusters includes ones of the pilot symbols, the ones of the pilot symbols being for respectively different ones of the data streams.

According to a second aspect of the present disclosure, there is provided an apparatus for generating a pilot pattern for data to be transmitted in an orthogonal frequency-division multiplexing (OFDM) based communication system, the apparatus being configured to: allocate pilot symbols for a plurality of data streams to form a plurality of pilot clusters in the pilot pattern, wherein each of the pilot clusters includes ones of the pilot symbols, the ones of the pilot symbols being for respectively different ones of the data streams.

According to a third aspect of the present disclosure, there is provided a method for generating a pilot pattern for data to be transmitted in an orthogonal frequency-division multiplexing (OFDM) based communication system, the method comprising: allocating first and second pilot symbols for first and second ones of a plurality of data streams, respectively, to a same subcarrier of the communication system, the first and second pilot symbols corresponding to a same time.

According to a fourth aspect of the present disclosure, there is provided an apparatus for generating a pilot pattern for data to be transmitted in an orthogonal frequency-division multiplexing (OFDM) based communication system, the apparatus being configured to: allocate first and second pilot symbols for first and second ones of a plurality of data streams, respectively, to a same subcarrier of the communication system, the first and second pilot symbols corresponding to a same time.

According to a fifth aspect of the present disclosure, there is provided an orthogonal frequency-division multiplexing (OFDM) based communication system for transmitting a plurality of data streams, the system being configured to: allocate pilot symbols for the plurality of data streams to form a plurality of pilot clusters in a pilot pattern, wherein each of the pilot clusters includes ones of the pilot symbols, the ones of the pilot symbols being for respectively different ones of the data streams.

According to a sixth aspect of the present disclosure, there is provided an orthogonal frequency-division multiplexing (OFDM) based communication system transmitting a plurality of data streams, the system being configured to: allocate first and second pilot symbols for first and second ones of a plurality of data streams, respectively, to a same subcarrier of the communication system, the first and second pilot symbols corresponding to a same time.

According to a seventh aspect of the present disclosure, there is provided a method for generating a pilot pattern for data to be transmitted in an orthogonal frequency-division multiplexing (OFDM) based communication system, the method comprising: allocating a plurality of pilot symbols for a data stream such that ones of the plurality of pilot symbols are uniformly distributed in the pilot pattern.

According to an eighth aspect of the present disclosure, there is provided a method for generating a new pilot pattern for data to be transmitted in an orthogonal frequency-division multiplexing (OFDM) based communication system, the method comprising: generating the new pilot pattern based on a given pilot pattern including a plurality of pilot symbols.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

FIG. 4 shows a pilot design example, according to an exemplary embodiment.

FIG. 9 shows a pilot design example, according to an exemplary embodiment.

FIG. 10 shows a pilot design example, according to an exemplary embodiment.

FIG. 11 shows a pilot design example, according to an exemplary embodiment.

FIG. 13 shows a pilot design example, according to an exemplary embodiment.

FIG. 14 shows a pilot design example, according to an exemplary embodiment.

FIGS. 16-24 show exemplary pilot patterns, according to exemplary embodiments.

FIGS. 25-30 show exemplary pilot patterns, according to exemplary embodiments.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In exemplary embodiments, there are provided methods for pilot design for data to be transmitted in a wireless communication system. For illustrative purposes only, it is assumed the communication system is an orthogonal frequency-division multiplexing (OFDM) based communication system transmitting first, second, third, and fourth data streams for embodiments illustrated in FIGS. 1-15.

Figure 1:
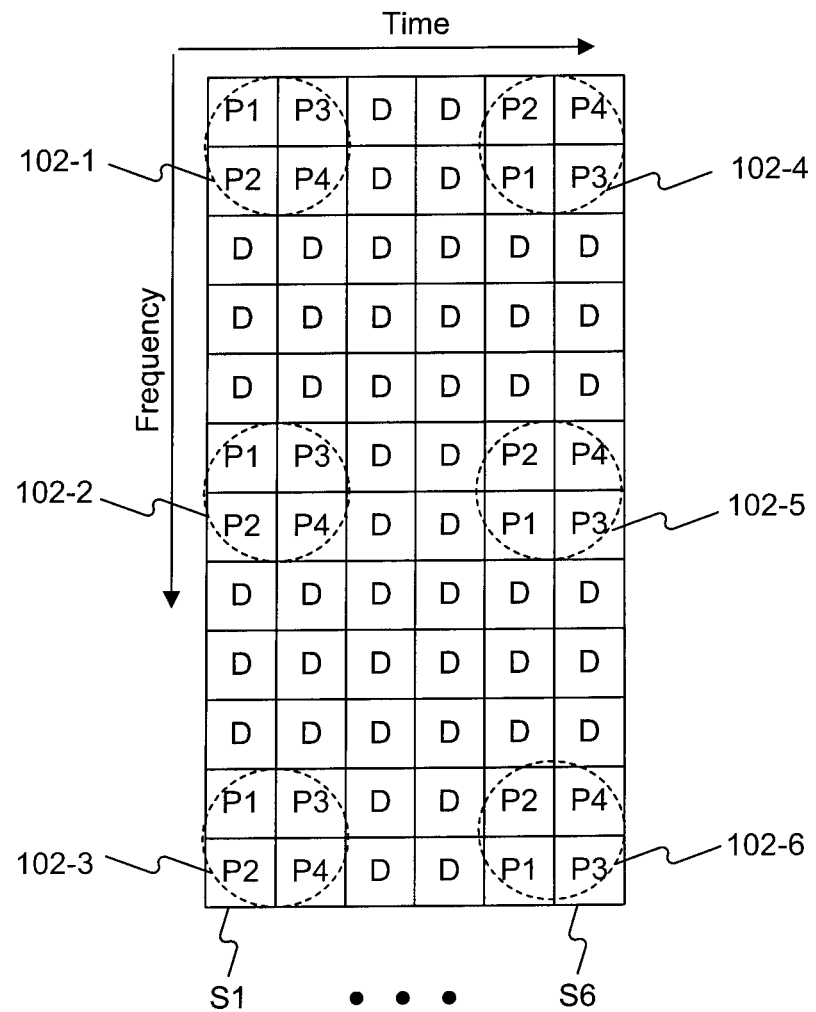
FIG. 1 illustrates a method for pilot design for data to be transmitted in a wireless communication system, according to an exemplary embodiment.

FIG. 1 illustrates a method for pilot design for data to be transmitted in the above noted OFDM based communication system, according to an exemplary embodiment. Referring to FIG. 1, a resource block 100 in a time-frequency domain is used to show an exemplary pilot pattern. For example, a resource block may be a representation including a plurality of contiguous OFDM symbols shown in a time-frequency domain. Each row of the resource block 100 corresponds to a subcarrier of the communication system, and each column of the resource block 100 corresponds to an OFDM symbol. The resource block 100 includes a plurality of OFDM symbols such as OFDM symbols S1, . . . , S6, which further include a plurality of data symbols each represented by a small block with a letter "D" and a plurality of pilot symbols each represented by a small block with an indexed letter P. For example, the small blocks with indexed letters "P1," "P2," "P3," and "P4" represent pilot symbols for the first, second, third, and fourth data streams, respectively. In the resource block 100, each of the OFDM symbols S1, . . . , S6 is composed of one of the columns of data symbols "D" and any pilot symbols included therein.

In exemplary embodiments, the pilot pattern is generated based on a moderate-overhead scheme. As noted above, pilot symbols are known to both a transmitter side and a receiver side of the communication system, and are inserted in OFDM symbols on the transmitter side for channel estimation on the receiver side. On one hand, pilot symbols typically do not carry information that the transmitter side intends to transmit to the receiver side and, hence, may cause communication overhead. On the other hand, an increased number of pilot symbols inserted in OFDM symbols may be beneficial to improve accuracy of channel estimation.

In exemplary embodiments, a plurality of pilot clusters 102-1, . . . 102-6, each indicated by one of the dashed circles in FIG. 1, may be formed in the pilot pattern. A pilot cluster may include first and second pilot symbols allocated to adjacent subcarriers of the communication system in one OFDM symbol, and/or first and second pilot symbols allocated to a same subcarrier of the communication system in adjacent OFDM symbols. In the illustrated embodiment, each of the pilot clusters 102-1, . . . 102-6 includes pilot symbols, each for one of the first, second, third, and fourth data streams.

In exemplary embodiments, ones of the pilot symbols may be allocated to first and second boundary subcarriers in the resource block 100, corresponding to the first and last rows of the resource block 100, respectively. For example, as shown FIG. 1, the pilot symbols P1 and P3 in the pilot cluster 102-1 are allocated to the first boundary subcarrier in the resource block 100. Also for example, the pilot symbols P2 and P4 in the pilot cluster 102-3 are allocated to the second boundary subcarrier in the resource block 100. When the ones of the pilot symbols are allocated to the first or second boundary subcarrier in the resource block 100, accuracy of channel estimation may be improved.

In exemplary embodiments, ones of the pilot clusters 102-1, . . . 102-6 may be allocated to corners of the resource block 100. For example, as shown FIG. 1, the pilot clusters 102-1, 102-3, 102-4, and 102-6 are allocated to the corners of the resource block 100. When the ones of the pilot clusters are allocated to the corners of the resource block 100, accuracy of channel estimation may be improved.

Figure 2:
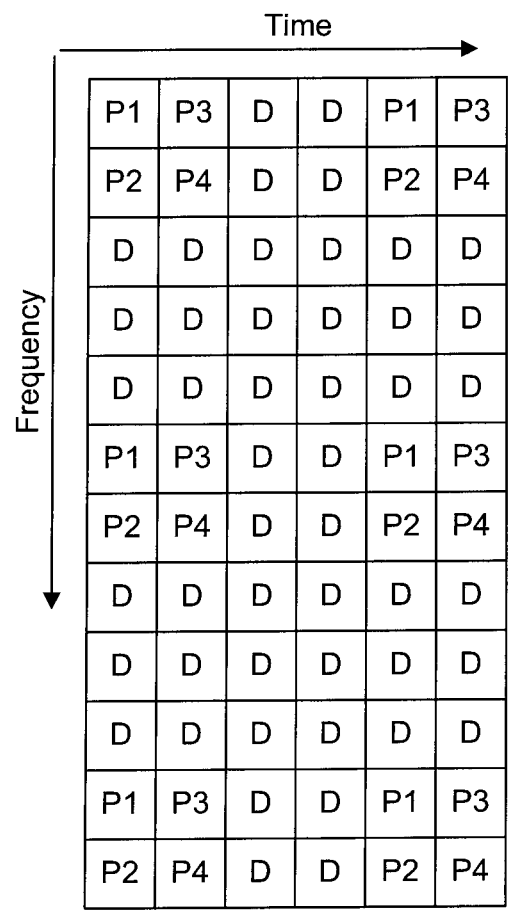
FIG. 2 shows a pilot design example, according to an exemplary embodiment.

In exemplary embodiments, a pilot pattern may be generated by interchanging positions of pilot symbols in ones of the pilot clusters 102-1, . . . , 102-6 in the resource block 100. For example, the positions of the pilot symbols P1 and P2 in each of the pilot clusters 102-4, 102-5, and 102-6 may be interchanged. Also for example, the positions of the pilot symbols P3 and P4 in each of the pilot clusters 102-4, 102-5, and 102-6 may be interchanged. FIG. 2 shows a pilot design example including the generated pilot pattern in a resource block 200, according to an exemplary embodiment.

Figure 3:
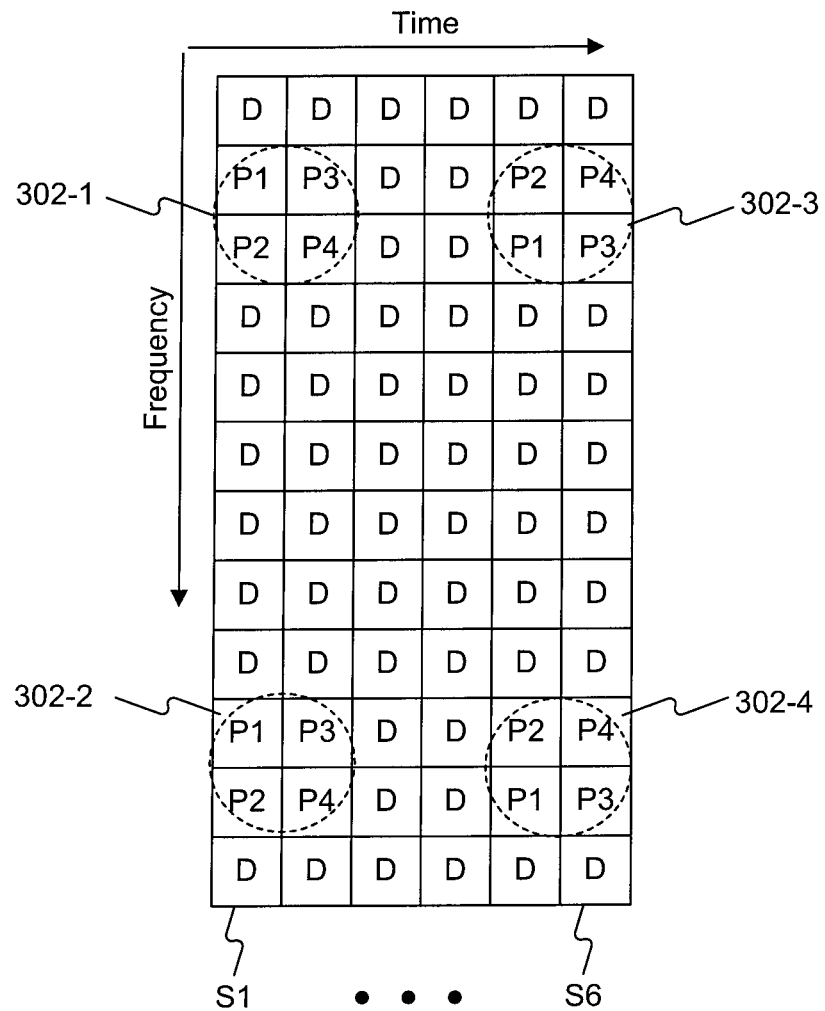
FIG. 3 illustrates a method for pilot design for data to be transmitted in a wireless communication system, according to an exemplary embodiment.

FIG. 3 illustrates a method for pilot design for data to be transmitted in the above noted OFDM based communication system, according to an exemplary embodiment. Referring to FIG. 3, a resource block 300 in a time-frequency domain is used to show a pilot pattern, according to an exemplary embodiment. Each row of the resource block 300 corresponds to a subcarrier of the communication system, and each column of the resource block 300 corresponds to an OFDM symbol. The resource block 300 includes a plurality of OFDM symbols such as OFDM symbols S1, . . . , S6, which further include a plurality of data symbols each represented by a small block with a letter "D" and a plurality of pilot symbols each represented by a small block with an indexed letter P. For example, the small blocks with indexed letters "P1," "P2," "P3," and "P4" represent pilot symbols for the first, second, third, and fourth data streams, respectively. In the resource block 300, each of the OFDM symbols S1, . . . , S6 is composed of one of the columns of data symbols "D" and any pilot symbols included therein.

In exemplary embodiments, the pilot pattern is generated based on a low-overhead scheme. In other words, the pilot pattern shown in FIG. 3 includes a relatively low number of pilot symbols, which may reduce communication overhead, compared to the pilot patterns based on the moderate-overhead scheme shown in FIGS. 1 and 2.

In exemplary embodiments, a plurality of pilot clusters 302-1, . . . 302-4, each indicated by one of the dashed circles in FIG. 3, may be formed in the pilot pattern. In the illustrated embodiment, each of the pilot clusters 302-1, . . . 302-4 includes pilot symbols, each for one of the first, second, third, and fourth data streams.

In exemplary embodiments, a pilot pattern may be generated by interchanging positions of pilot symbols in ones of the pilot clusters 302-1, . . . , 302-4 in the resource block 300. For example, the positions of the pilot symbols P1 and P2 in each of the pilot clusters 302-3 and 302-4 may be interchanged. Also for example, the positions of the pilot symbols P3 and P4 in each of the pilot clusters 302-3 and 302-4 may be interchanged. FIG. 4 shows a pilot design example including the generated pilot pattern in a resource block 400, according to an exemplary embodiment.

Figure 5:
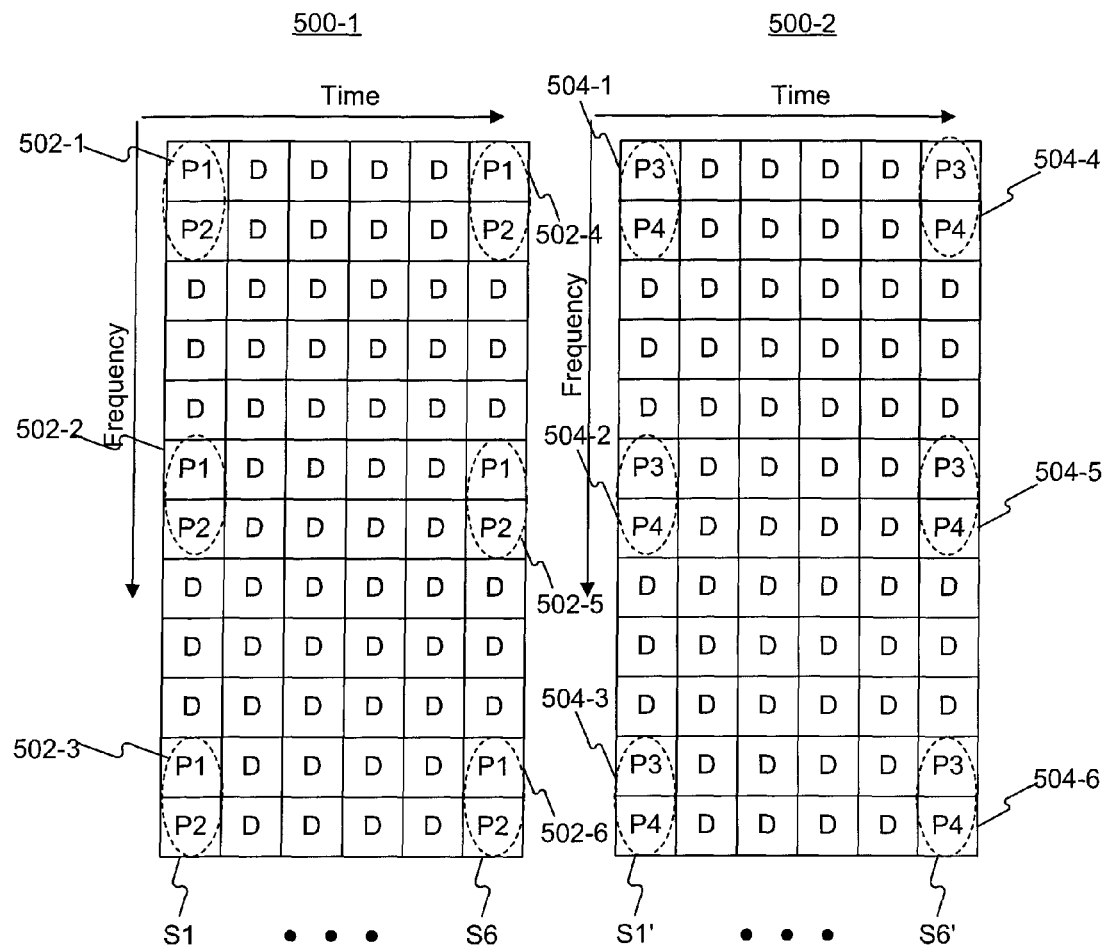
FIG. 5 illustrates a method for pilot design for data to be transmitted in a wireless communication system, according to an exemplary embodiment.

FIG. 5 illustrates a method for pilot design for data to be transmitted in the above noted OFDM based communication system, according to an exemplary embodiment. Referring to FIG. 5, a combination of first and second resource blocks 500-1 and 500-2 in a time-frequency domain is used to show an exemplary pilot pattern. Each row of the resource block 500-1 or 500-2 corresponds to a subcarrier of the communication system, and each column of the resource block 500-1 or 500-2 corresponds to an OFDM symbol. In addition, an $i^{th}$ row of the resource block 500-1 and an $i^{th}$ row of the resource block 500-2 correspond to a same subcarrier of the communication system, and a $j^{th}$ column of the resource block 500-1 and a $j^{th}$ column of the resource block 500-2 correspond to a same time.

The resource block 500-1 includes a plurality of OFDM symbols such as OFDM symbols S1, . . . , S6, which further include a plurality of data symbols each represented by a small block with a letter "D" and a plurality of pilot symbols each represented by a small block with an indexed letter P. For example, the small blocks with indexed letters "P1" and "P2" represent pilot symbols for the first and second data streams, respectively. In the resource block 500-1, each of the OFDM symbols S1, S6 is composed of one of the columns of data symbols "D" and any pilot symbols included therein.

The resource block 500-2 includes a plurality of OFDM symbols such as OFDM symbols S1', . . . , S6', which correspond to the OFDM symbols S1, . . . , S6, respectively, and include a plurality of data symbols each represented by a small block with a letter "D" and a plurality of pilot symbols each represented by a small block with an indexed letter P. For example, the small blocks with indexed letters "P3" and "P4" represent pilot symbols for the third and fourth data streams, respectively. In the resource block 500-2, each of the OFDM symbols S1', . . . , S6' is composed of one of the columns of data symbols "D" and any pilot symbols included therein.

In exemplary embodiments, a plurality of pilot clusters 502-1, . . . 502-6, each indicated by one of the dashed circles in the resource block 500-1, may be formed in the pilot pattern. Each of the pilot clusters 502-1, . . . 502-6 includes pilot symbols, each for one of the first and second data streams. Similarly, a plurality of pilot clusters 504-1, . . . 504-6, each indicated by one of the dashed circles in the resource block 500-2, may be formed in the pilot pattern. Each of the pilot clusters 504-1, . . . 504-6 includes pilot symbols, each for one of the third and fourth data streams.

In exemplary embodiments, pilot symbols for different data streams may be allocated to a same subcarrier of the communication system, the allocated pilot symbols corresponding to a same time. For example, the pilot symbol P1 in the pilot cluster 502-1 and the pilot symbol P3 in the pilot cluster 504-1 are allocated to a same subcarrier of the communication system and correspond to a same time. Also for example, the pilot symbol P2 in the pilot cluster 502-3 and the pilot symbol P4 in the pilot cluster 504-3 are allocated to a same subcarrier of the communication system and correspond to a same time.

In exemplary embodiments, pilot symbols for different data streams that are allocated to a same subcarrier of the communication system may be multiplied by mutually orthogonal codes, e.g., Walsh codes. As a result, generated pilot patterns may support and simplify multi-user channel estimation, and may not increase communication overhead.

For example, the pilot symbols P1 in the pilot clusters 502-1 and 502-4 may be multiplied by a first code, and the pilot symbols P3 in the pilot clusters 504-1 and 504-4 may be multiplied by a second code, the first and second codes being mutually orthogonal. Also for example, the pilot symbols P2 in the pilot clusters 502-1 and 502-4 may be multiplied by a third code, and the pilot symbols P4 in the pilot clusters 504-1 and 504-4 may be multiplied by a fourth code, the third and fourth codes being mutually orthogonal.

In exemplary embodiments, the pilot pattern shown in FIG. 5 is generated based on a moderate-overhead scheme. As noted above, pilot symbols are known to both a transmitter side and a receiver side of a communication system, and are inserted in OFDM symbols on a transmitter side for channel estimation on a receiver side. On one hand, pilot symbols typically do not carry information that the transmitter side intends to transmit to the receiver side and, hence, may cause communication overhead. On the other hand, an increased number of pilot symbols inserted in OFDM symbols may be beneficial to improve accuracy of channel estimation.

In exemplary embodiments, ones of the pilot symbols may be allocated to first and second boundary subcarriers in each of the resource blocks 500-1 and 500-2, corresponding to the first and last rows of the resource block 500-1 or 500-2, respectively. For example, the pilot symbols P1 in the pilot clusters 502-1 and 502-4 are allocated to the first boundary subcarrier of the resource block 500-1, and the pilot symbols P2 in the pilot clusters 502-3 and 502-6 are allocated to the second boundary subcarrier of the resource block 500-1. Also for example, the pilot symbols P3 in the pilot clusters 504-1 and 504-4 are allocated to the first boundary subcarrier of the resource block 500-2, and the pilot symbols P4 in the pilot clusters 504-3 and 504-6 are allocated to the second boundary subcarrier of the resource block 500-2. When pilot symbols are allocated to the boundary subcarriers in the resource block 500-1 or 500-2, accuracy of channel estimation may be improved.

Figure 6:
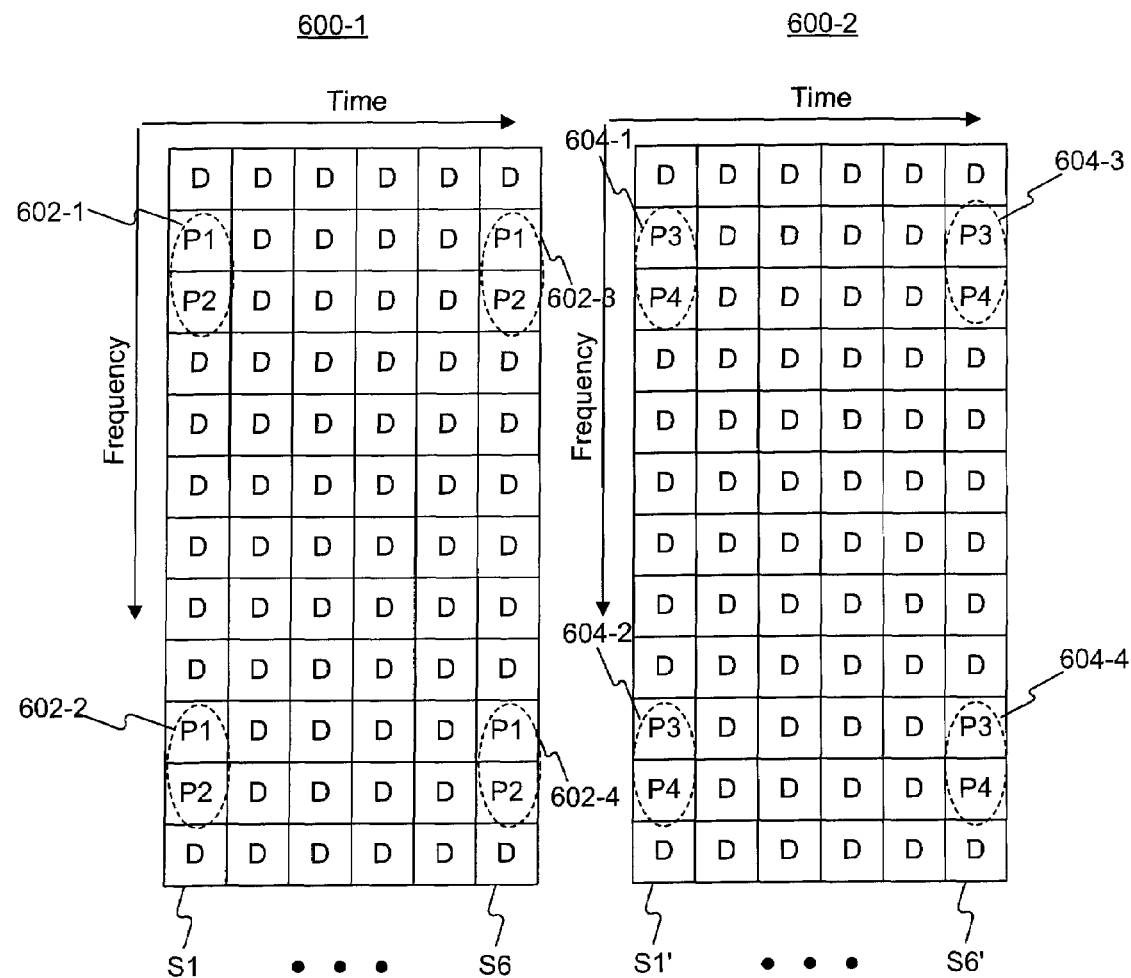
FIG. 6 illustrates a method for pilot design for data to be transmitted in a wireless communication system, according to an exemplary embodiment.

FIG. 6 illustrates a method for pilot design for data to be transmitted in the above noted OFDM based communication system, according to an exemplary embodiment. Referring to FIG. 6, a combination of first and second resource blocks 600-1 and 600-2 in a time-frequency domain is used to show an exemplary pilot pattern. Each row of the resource block 600-1 or 600-2 corresponds to a subcarrier of the communication system, and each column of the resource block 600-1 or 600-2 corresponds to an OFDM symbol. In addition, an $i^{th}$ row of the resource block 600-1 and an $i^{th}$ row of the resource block 600-2 correspond to a same subcarrier of the communication system, and a $j^{th}$ column of the resource block 600-1 and a $j^{th}$ column of the resource block 600-2 correspond to a same time.

The resource block 600-1 includes a plurality of OFDM symbols such as OFDM symbols S1, . . . , S6, which further include a plurality of data symbols each represented by a small block with a letter "D" and a plurality of pilot symbols each represented by a small block with an indexed letter P. For example, the small blocks with indexed letters "P1" and "P2" represent pilot symbols for the first and second data streams, respectively. In the resource block 600-1, each of the OFDM symbols S1, S6 is composed of one of the columns of data symbols "D" and any pilot symbols included therein.

The resource block 600-2 includes a plurality of OFDM symbols such as OFDM symbols S1', . . . , S6', which correspond to the OFDM symbols S1, . . . , S6, respectively, and include a plurality of data symbols each represented by a small block with a letter "D" and a plurality of pilot symbols each represented by a small block with an indexed letter P. For example, the small blocks with indexed letters "P3" and "P4" represent pilot symbols for the third and fourth data streams, respectively. In the resource block 600-2, each of the OFDM symbols S1', . . . , S6' is composed of one of the columns of data symbols "D" and any pilot symbols included therein.

In exemplary embodiments, a plurality of pilot clusters 602-1, . . . 602-4, each indicated by one of the dashed circles in the resource block 600-1, may be formed in the pilot pattern. Each of the pilot clusters 602-1, . . . 602-4 includes pilot symbols, each for one of the first and second data streams. Similarly, a plurality of pilot clusters 604-1, . . . 604-4, each indicated by one of the dashed circles in the resource block 600-2, may be formed in the pilot pattern. Each of the pilot clusters 604-1, . . . 604-4 includes pilot symbols, each for one of the third and fourth data streams.

In exemplary embodiments, pilot symbols for different data streams may be allocated to a same subcarrier of the communication system, the allocated pilot symbols corresponding to a same time. For example, the pilot symbol P1 in the pilot cluster 602-1 and the pilot symbol P3 in the pilot cluster 604-1 are allocated to a same subcarrier of the communication system and correspond to a same time. Also for example, the pilot symbol P2 in the pilot cluster 602-2 and the pilot symbol P4 in the pilot cluster 604-2 are allocated to a same subcarrier of the communication system and correspond to a same time.

In exemplary embodiments, pilot symbols for different data streams that are allocated to a same subcarrier of the communication system may be multiplied by mutually orthogonal codes, e.g., Walsh codes, such that the pilot symbols for the different data streams may be extracted on a receiver side of the communication system. As a result, generated pilot patterns may support and simplify multi-user channel estimation, and may not increase communication overhead.

For example, the pilot symbols P1 in the pilot clusters 602-1 and 602-3 may be multiplied by a first code, and the pilot symbols P3 in the pilot clusters 604-1 and 604-3 may be multiplied by a second code, the first and second codes being mutually orthogonal. Also for example, the pilot symbols P2 in the pilot clusters 602-1 and 602-3 may be multiplied by a third code, and the pilot symbols P4 in the pilot clusters 604-1 and 604-3 may be multiplied by a fourth code, the third and fourth codes being mutually orthogonal.

In exemplary embodiments, the pilot pattern is generated based on a low-overhead scheme. In other words, the pilot pattern shown in FIG. 6 includes a relatively low number of pilot symbols, which may reduce communication overhead, compared to the pilot pattern based on the moderate-overhead scheme shown in FIG. 5.

Figure 7:
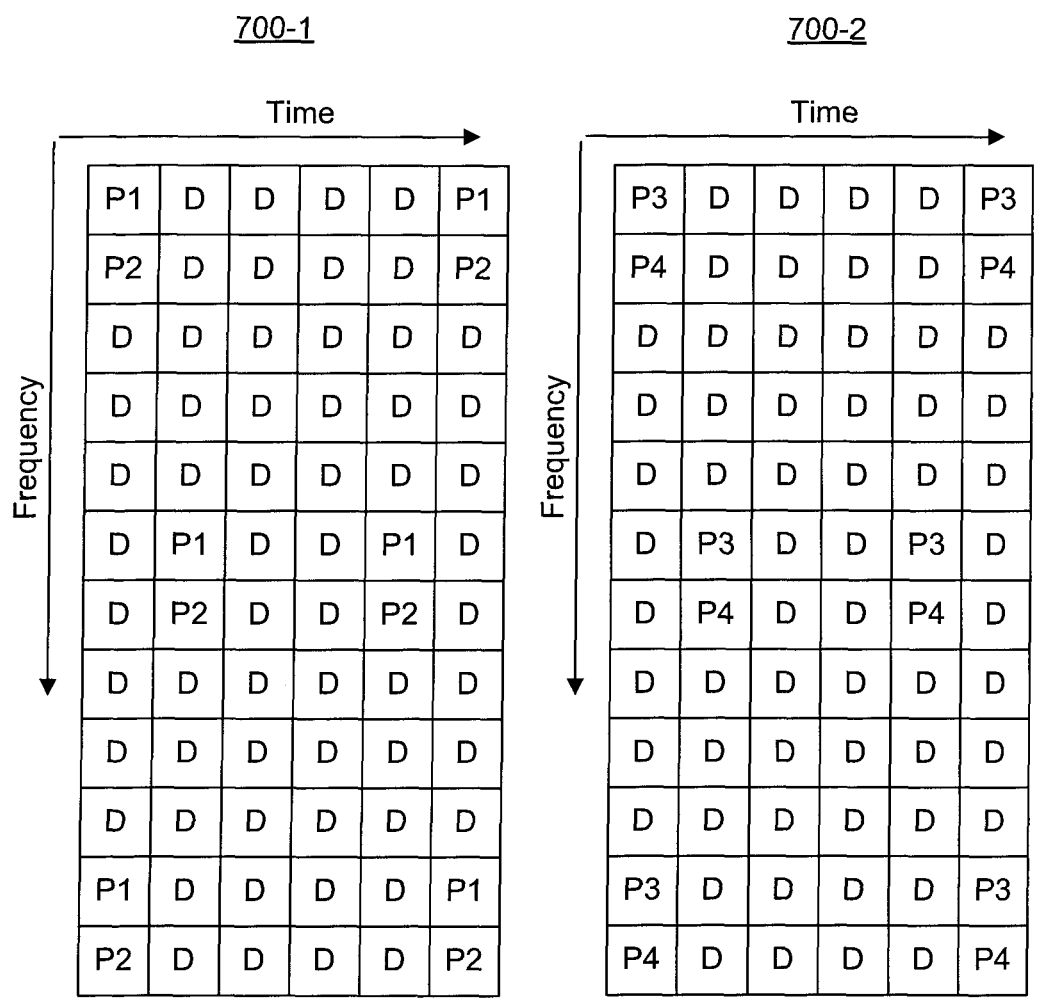
FIG. 7 shows a pilot design example, according to an exemplary embodiment.

In exemplary embodiments, pilot symbols at boundary times in a resource block, corresponding to the first and last columns of the resource block, may be symmetrically shifted to intermediate times in the resource block. FIG. 7 shows a pilot design example in first and second resource blocks 700-1 and 700-2 formed by varying the resource blocks 500-1 and 500-2 (FIG. 5), respectively, by symmetrically shifting the pilot symbols in the pilot clusters 502-2 and 502-5 at boundary times of the resource block 500-1 to intermediate times, and symmetrically shifting the pilot symbols in the pilot clusters 504-2 and 504-5 at boundary times of the resource block 500-2 to intermediate times, according to an exemplary embodiment.

Figure 8:
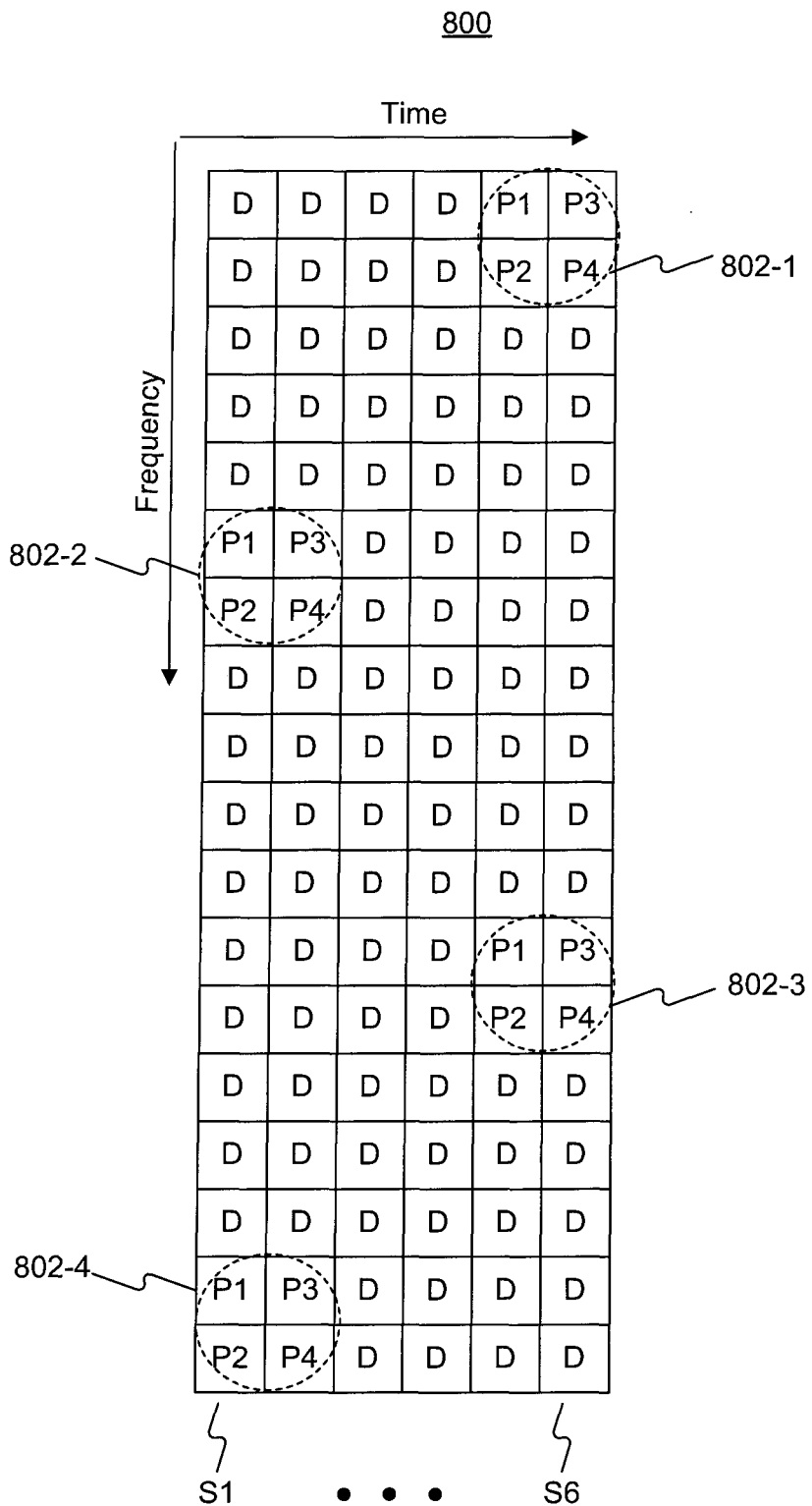
FIG. 8 illustrates a method for pilot design for data to be transmitted in a wireless communication system, according to an exemplary embodiment.

FIG. 8 illustrates a method for pilot design for data to be transmitted in the above noted OFDM based communication system, according to an exemplary embodiment. Referring to FIG. 8, a resource block 800 in a time-frequency domain is used to show an exemplary pilot pattern. Each row of the resource block 800 corresponds to a subcarrier of the communication system, and each column of the resource block 800 corresponds to an OFDM symbol. The resource block 800 includes a plurality of OFDM symbols such as OFDM symbols S1, ..., S6, which further include a plurality of data symbols each represented by a small block with a letter "D" and a plurality of pilot symbols each represented by a small block with an indexed letter P. For example, the small blocks with indexed letters "P1," "P2," "P3," and "P4" represent pilot symbols for first, second, third, and fourth data streams, respectively. In the resource block 800, each of the OFDM symbols S1, ..., S6 is composed of one of the columns of data symbols "D" and any pilot symbols included therein.

In exemplary embodiments, a plurality of pilot clusters 802-1, ... 802-4, each indicated by one of the dashed circles in FIG. 8, may be formed in the pilot pattern. Each of the pilot clusters 802-1, ... 802-4 includes pilot symbols, each for one of the first, second, third, and fourth data streams.

In exemplary embodiments, a pilot pattern may be generated by moving a pilot cluster from a first location in a resource block to a second location in the resource block, the first and second locations being symmetrical in time. FIG. 9 shows a pilot design example in a resource block 900 generated by moving each of the pilot clusters 802-1, ... 802-4 from a first location to a second location in the resource block 800 (FIG. 8), the first and second locations being symmetrical in time, according to an exemplary embodiment.

In exemplary embodiments, a pilot pattern may be generated based on first and second pilot patterns. FIG. 10 shows a pilot design example in a resource blocks 1000 generated based on the resource block 800 (FIG. 8) and the resource block 900 (FIG. 9), according to an exemplary embodiment. For example, locations of the pilot symbols for the first and third data streams in the resource block 1000 correspond to locations of the pilot symbols for the first and third data streams in the resource block 900 (FIG. 9). Also for example, locations of the pilot symbols for the second and fourth data streams in the resource block 1000 correspond to locations of the pilot symbols for the second and fourth data streams in the resource block 800 (FIG. 8). Each of the pilot patterns shown in FIGS. 8-10 may provide good channel estimation when the communication system moves at a relatively high speed.

In exemplary embodiments, pilot symbols for a data stream may be distributed in different OFDM symbols in a resource block. As a result, power fluctuation between the OFDM symbols may be reduced, and accuracy of channel estimation may be improved. FIG. 11 shows a pilot design example in a resource blocks 1100 in which the pilot symbols for each of the first, second, third, and fourth data streams are distributed in different OFDM symbols, according to an exemplary embodiment. For example, the resource block 1100 may be generated based on the resource block 1000 (FIG. 10), by interchanging ones of the pilot symbols for the first data stream and ones of the pilot symbols for the third data stream, and interchanging ones of the pilot symbols for the second data stream and ones of the pilot symbols for the fourth data stream in the resource block 1000 (FIG. 10).

In exemplary embodiments, locations of pilot symbols in a resource block may be determined based on various multiple-input and multiple-output (MIMO) applications such as a space-time block codes (STBC) application, a space-frequency block codes (SFBC) application, a spatial multiplexing (SM) application, or a multi-user MIMO (MU-MIMO) application. For example, the pilot patterns in FIGS. 8-11 may be used in the STBC, SM, or MU-MIMO applications. Pilot patterns may also be generated for use in the SFBC application by modifying the pilot patterns in FIGS. 8-11.

Figure 12:
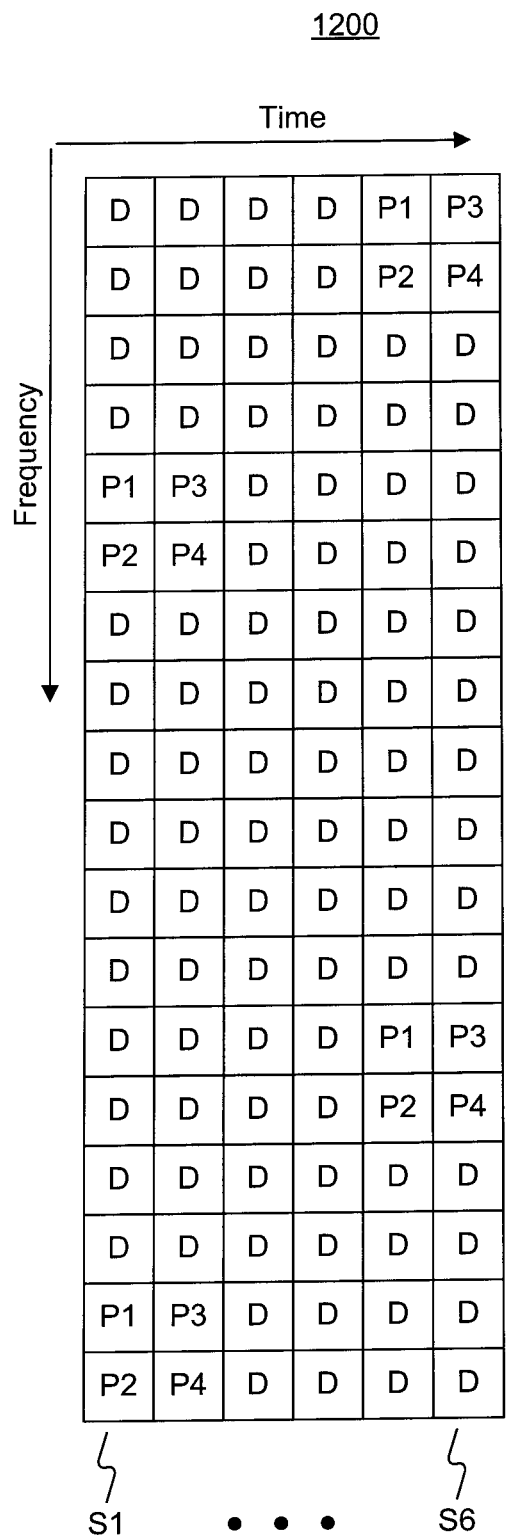
FIG. 12 shows a pilot design example, according to an exemplary embodiment.

In one exemplary embodiment, positions of the pilot symbols in the pilot clusters 802-2 and 802-3 in the resource block 800 (FIG. 8) may be changed, to generate a pilot pattern for use in the SFBC application. FIG. 12 shows a pilot design example including the generated pilot pattern in a resource block 1200, according to an exemplary embodiment. For example, each column of the resource block 1200 corresponds to an OFDM symbol, and includes an even number of consecutive data symbols. Therefore, the pilot pattern shown in the resource block 1200 may be used in the SFBC application.

Figure 15:
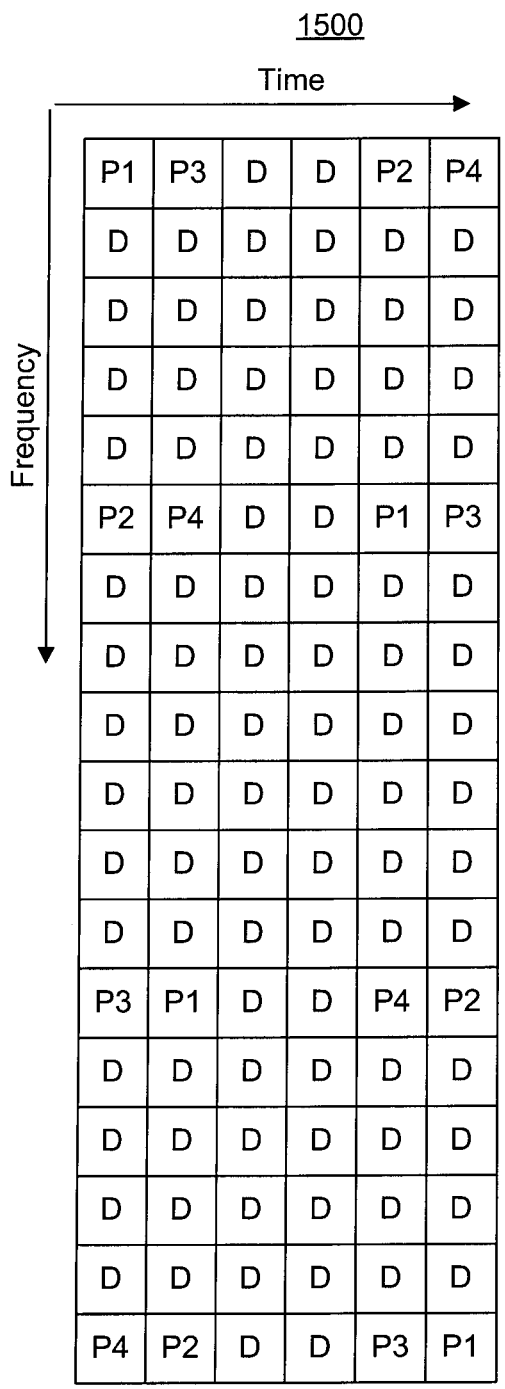
FIG. 15 shows a pilot design example, according to an exemplary embodiment.

FIGS. 13-15 show exemplary pilot patterns in resource blocks 1300, 1400, and 1500, respectively, for use in the SFBC application, according to exemplary embodiments. Similar to the above description in connection with generating the pilot pattern shown in FIG. 12, the resource blocks 1300 (FIG. 13), 1400 (FIG. 14), and 1500 (FIG. 15) may be generated based on the resource blocks 900 (FIG. 9), 1000 (FIG. 10), and 1100 (FIG. 11), respectively. As a result, each column of the resource block 1300, 1400, or 1500, corresponding to an OFDM symbol, includes an even number of consecutive data symbols. Accordingly, the pilot patterns shown in FIGS. 13-15 may be used in the SFBC application.

In exemplary embodiments, the pilot pattern shown in each of FIGS. 1-15 may be used for a single-user MIMO system or a multi-user MIMO system. For example, if the communication system is a single-user MIMO system, the first, second, third, and fourth data streams may be received by first, second, third, and fourth antennas of a receiver in the communication system, respectively. Also for example, if the communication system is a multiple-user MIMO system, the transmitted first, second, third, and fourth data streams may be received by first and second antennas of each of first and second receivers in the communication system, respectively.

In exemplary embodiments, a single-stream pilot pattern for a single data stream may be generated based on the pilot pattern for the first, second, third, and fourth data streams shown in each of FIGS. 1-15. For example, all the pilot symbols P1 for the first data stream may be used as pilot symbols for the single data stream. In addition, all the pilot symbols P2, P3, and P4 for the second, third, and fourth data streams may be replaced by data symbols for the single date stream.

In exemplary embodiments, different factors may be considered to generate a pilot pattern. For example, communication overhead due to pilot symbols may need to be minimized without significantly degrading accuracy of channel estimation. Also for example, frequency spacing of pilot symbols for a data stream may be set relatively small to provide good interpolation for a frequency-selective channel. Furthermore, extrapolation generally needs to be avoided or minimized, and boundary subcarriers in a resource block are preferred to include pilot symbols for mitigating extrapolation error.

In exemplary embodiments, additional factors may be considered to generate a pilot pattern represented by a resource block that is relatively small. For example, a resource block including six subcarriers may be considered as a relatively small resource block. When the resource block is relatively small, communication overhead due to pilot allocation may be increased and pilot efficiency may be lowered, because a number of pilot symbols in the resource block may account for a relatively high percentage of a total number of pilot and data symbols in that resource block. Therefore, overhead optimization may need to be considered to generate the pilot pattern represented by the relatively small resource block.

In addition, pilot symbols, compared to data symbols, typically modulate subcarriers that have a relatively high power, which may provide an advantage of increased reliability for channel estimation. However, that advantage may diminish because pilot signals from a first sector/cell may cause interference with pilot signals from a second sector/cell that is adjacent to the first sector/cell. Accordingly, additional factors may be considered to generate a pilot pattern represented by a relatively small resource block.

In exemplary embodiments, exemplary rules for designing a pilot pattern represented by a resource block that is relatively small may include designing the pilot pattern to facilitate channel estimation. For example, a number of pilot symbols may be reduced in the resource block, such that communication overhead may be reduced. Also for example, pilot symbols may be allocated to boundary subcarriers in the resource block, corresponding to the first and last rows of the resource block, such that extrapolation may be minimized or avoided when performing channel estimation based on the resource block. Further for example, pilot symbols may be allocated to achieve a distribution in the resource block that is as uniform as possible. In one aspect, pilot symbols that have a relatively uniform distribution in subcarrier frequency may improve accuracy of channel estimation. In another aspect, pilot symbols that have a relatively uniform distribution in time may reduce power fluctuation between OFDM symbols.

In exemplary embodiments, exemplary rules for designing a pilot pattern represented by a resource block that is relatively small may include designing the pilot pattern to facilitate pilot allocation for multiple data streams, and to facilitate reduction of interference between different pilot patterns. In addition, for use in the SFBC or STBC application noted above, data symbols may be allocated in the resource block to form as many pairs of data symbols as possible. Each of the pairs of data symbols may be allocated to adjacent times corresponding to a same subcarrier frequency for the STBC application, or be allocated to adjacent subcarrier frequencies corresponding to a same time for the SFBC application.

FIGS. 16-24 show exemplary pilot patterns designed based on the above-described rules, according to exemplary embodiments. The pilot patterns are represented by relatively small resource blocks 1600-2400, respectively. For illustrative purposes only, it is assumed that the resource blocks 1600-2400 each include six subcarriers and six OFDM symbols, and are designed for data transmission in an OFDM based communication system transmitting first and second data streams.

Each row of each of the resource blocks 1600-2400 corresponds to a subcarrier of the communication system, and each column of each of the resource blocks 1600-2400 corresponds to an OFDM symbol. The resource blocks 1600-2400 each include a plurality of OFDM symbols, which further include a plurality of data symbols each represented by a small block with a letter "D," and a plurality of pilot symbols each represented by a small block with an indexed letter P. For example, the small blocks with indexed letters "P1" and "P2" represent pilot symbols for the first and second data streams, respectively. In each of the resource blocks 1600-2400, each of the OFDM symbols is composed of one of the columns of data symbols "D" and any pilot symbols included therein.

Figure 16:
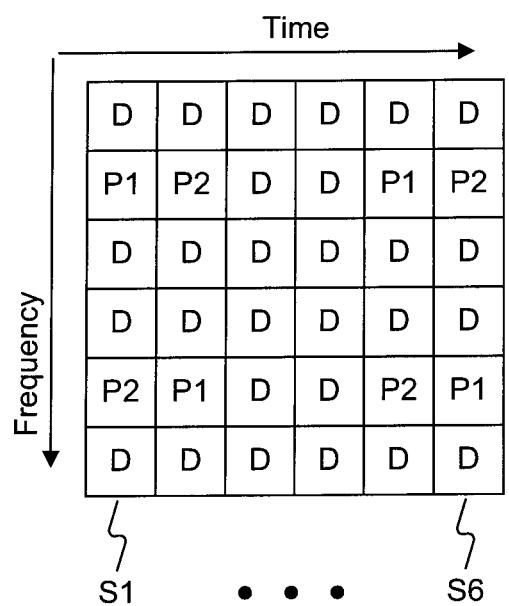

For example, in the resource block 1600 shown in FIG. 16, pilot symbols for the first data stream ("P1") have a relatively uniform distribution in the resource block 1600, and are distributed in different OFDM symbols. Pilot symbols for the second data stream ("P2") also have a relatively uniform distribution in the resource block 1600, and are distributed in different OFDM symbols. As a result, power fluctuation between OFDM symbols in the resource block 1600 may be reduced, and accuracy of channel estimation may be improved.

Figure 17:
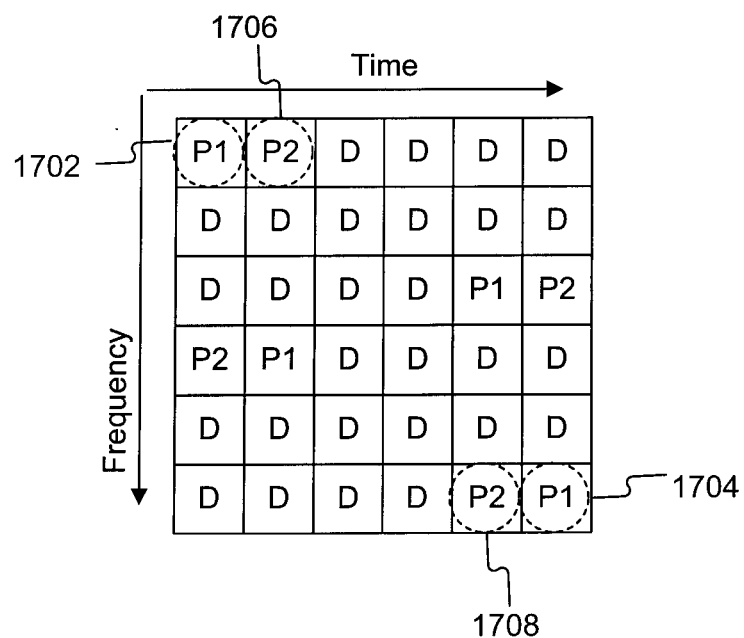
Figure 19:
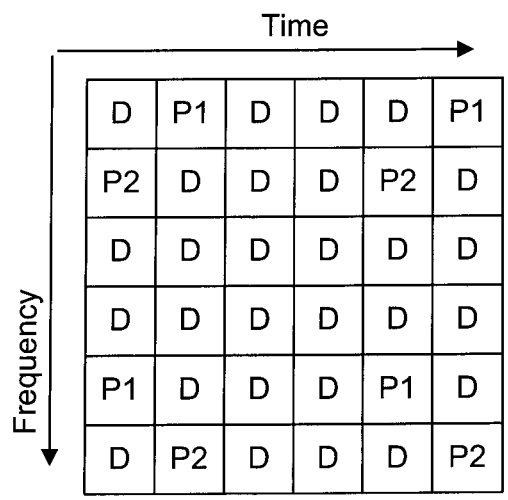
Figure 21:
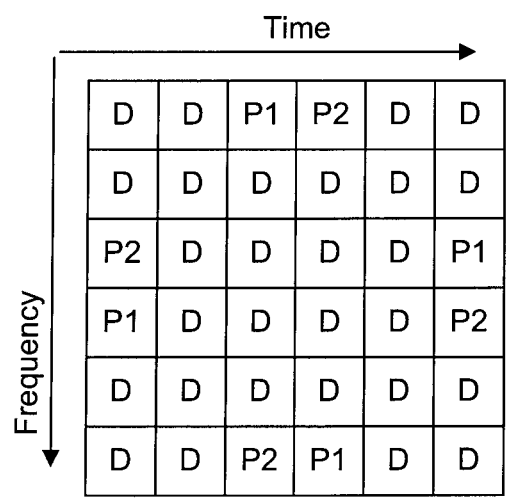
Figure 22:
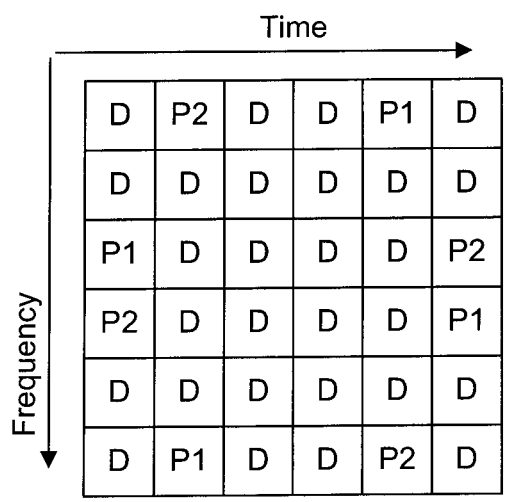
Figure 24:
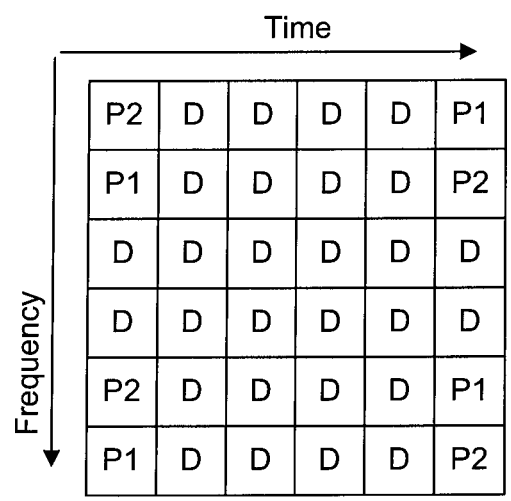
Figure 26:
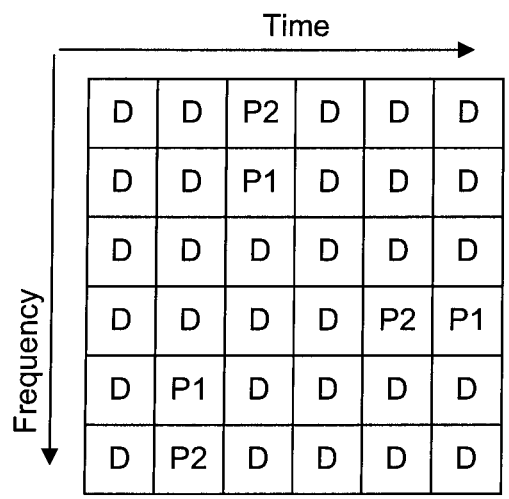
Figure 27:
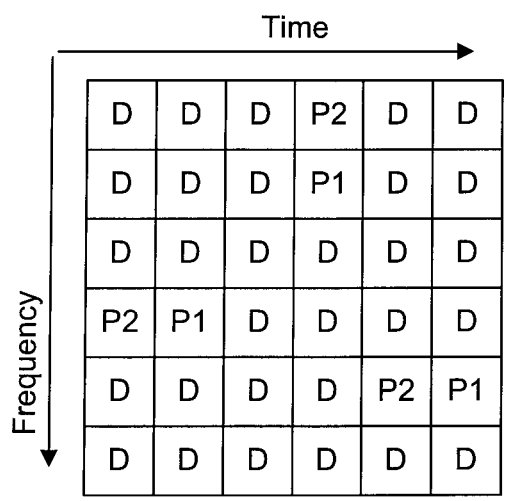
Figure 28:
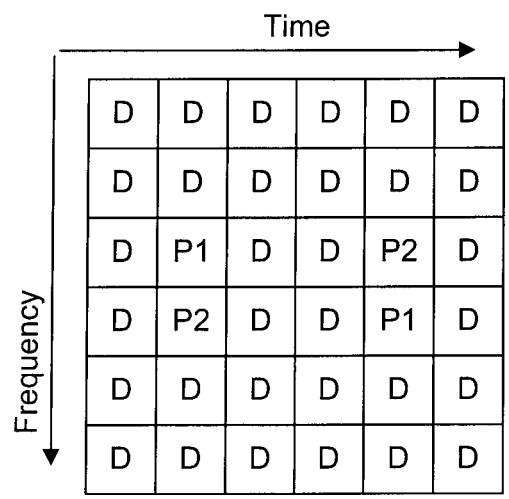
Figure 29:
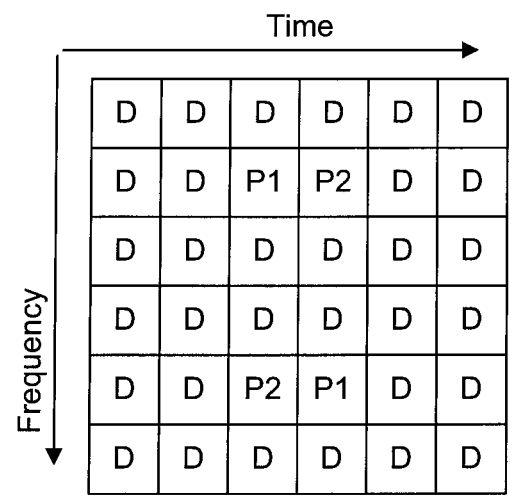
Figure 30:
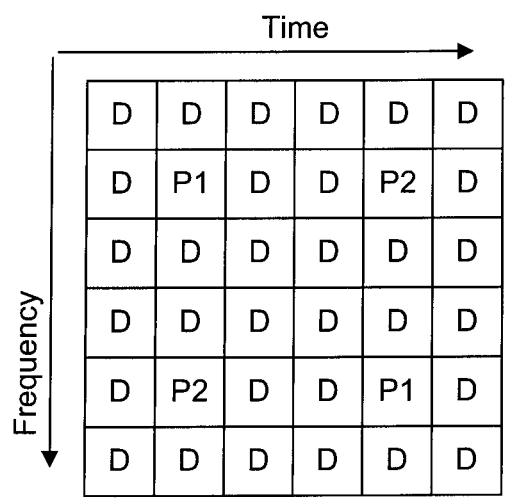

Also for example, in the resource block 1700 shown in FIG. 17, ones of the pilot symbols for the first data stream, indicated by dashed circles 1702 and 1704, are allocated to boundary subcarriers in the resource block 1700, corresponding to the first and last rows of the resource block 1700. Ones of the pilot symbols for the second data stream, indicated by dashed circles 1706 and 1708, are also allocated to the boundary subcarriers in the resource block 1700. As a result, extrapolation may be avoided when performing channel estimation based on the resource block 1700. Therefore, the pilot pattern represented by the resource block 1700 may be used to facilitate channel estimation, and facilitate pilot allocation for multiple data streams.

Similar to the description above in connection with the resource block 1600 (FIG. 16) and the resource block 1700 (FIG. 17), the pilot patterns represented by the resource blocks 1800-2400 shown in FIGS. 18-24, respectively, may be used to facilitate channel estimation, and facilitate pilot allocation for multiple data streams.

In exemplary embodiments, a number of pilot symbols in each of the resource blocks 1600-2400 (FIGS. 16-24) may be reduced, to reduce communication overhead. FIGS. 25-30 show exemplary pilot patterns each having a reduced number of pilot symbols and configured based on the above-described rules, according to exemplary embodiments. The pilot patterns are represented by relatively small resource blocks 2500-3000, respectively. For illustrative purposes only, it is assumed that the resource blocks 2500-3000 each include six subcarriers and six OFDM symbols, and are designed for data transmission in an OFDM based communication system transmitting first and second data streams.

Figure 31:
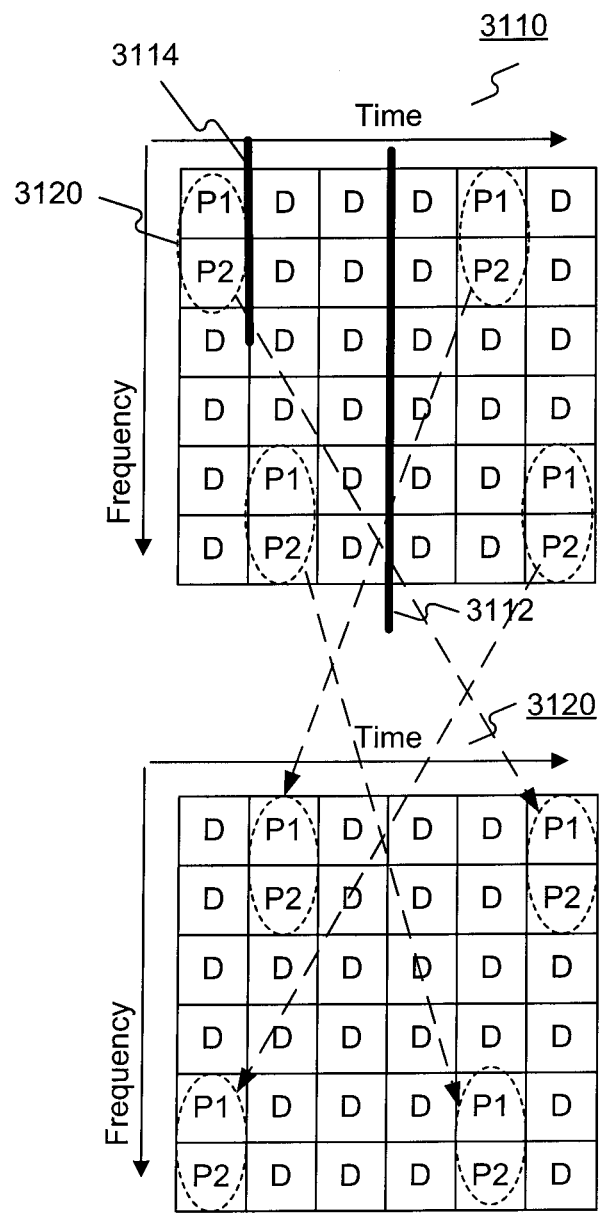
FIG. 31 shows an exemplary, new pilot pattern generated based on a given pilot pattern, according to an exemplary embodiment.

In exemplary embodiments, a given pilot pattern may be varied to generate a new pilot pattern, based on a symmetrical mapping of pilot symbols in a resource block representing the given pilot pattern. FIG. 31 shows an exemplary, new pilot pattern generated by varying a given pilot pattern based on symmetrical mapping, according to an exemplary embodiment. The given and new pilot patterns are represented by resource blocks 3110 and 3120, respectively. The resource block 3110 includes a plurality of OFDM symbols, which further include a plurality of data symbols each represented by a small block with a letter "D" and a plurality of pilot symbols each represented by a small block with a letter P. For example, the small blocks with indexed letters "P1" and "P2" represent pilot symbols for first and second data streams, respectively. In the resource block 3110, each of the OFDM symbols is composed of one of the columns of data symbols "D" and any pilot symbols included therein.

In one exemplary embodiment, a symmetrical mapping may be performed on the pilot symbols in the resource block 3110 with respect to a time reference or a frequency reference. For example, all of the pilot symbols in the resource block 3110 may be reflected across a time reference 3112 to generate the resource block 3120, as indicated by the dashed arrows. As a result, the new pilot pattern, represented by the resource block 3120, is generated.

In exemplary embodiments, a symmetrical mapping of pilot symbols may be performed on ones of the pilot symbols in the resource block 3110. For example, a symmetrical mapping may be performed on pilot symbols 3120 in the resource block 3110 with respect to a time reference 3114, to generate a new pilot pattern (not shown).

Figure 32A:
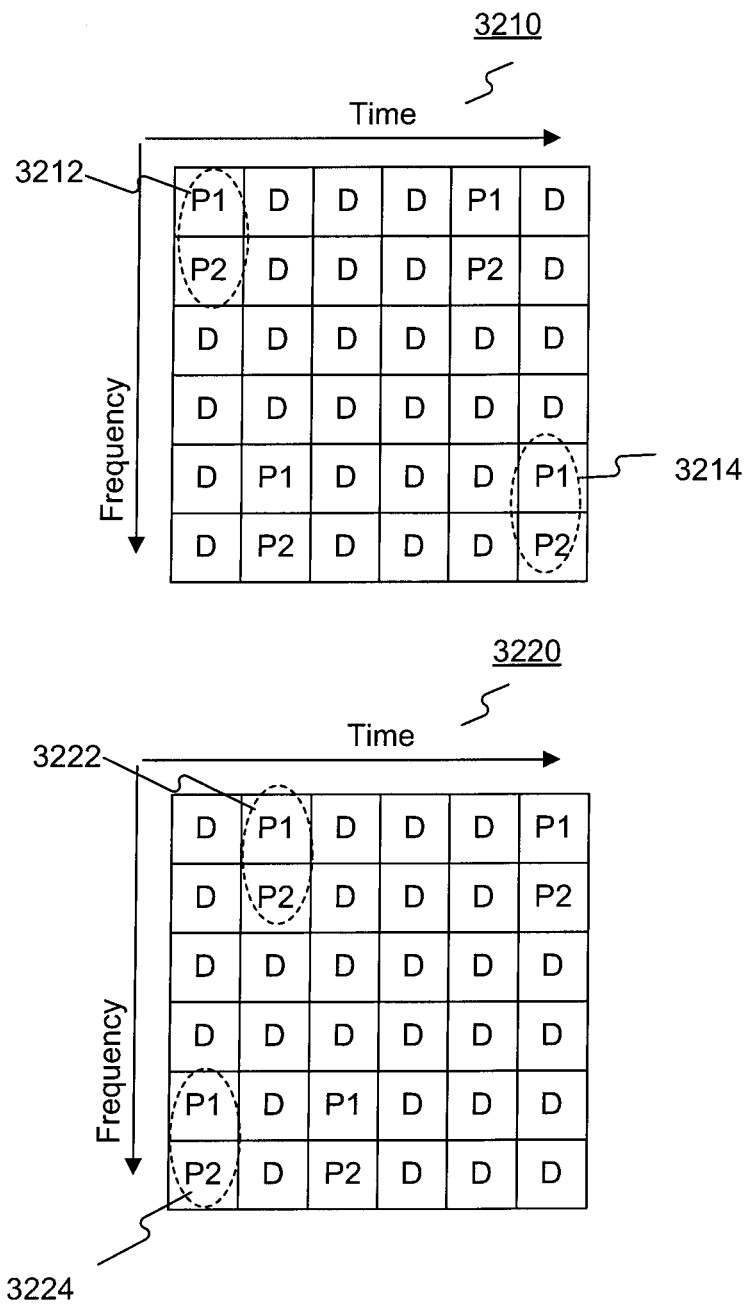
FIGS. 32A and 32B show exemplary, new pilot patterns generated based on a given pilot pattern, according to an exemplary embodiment.
Figure 32B:
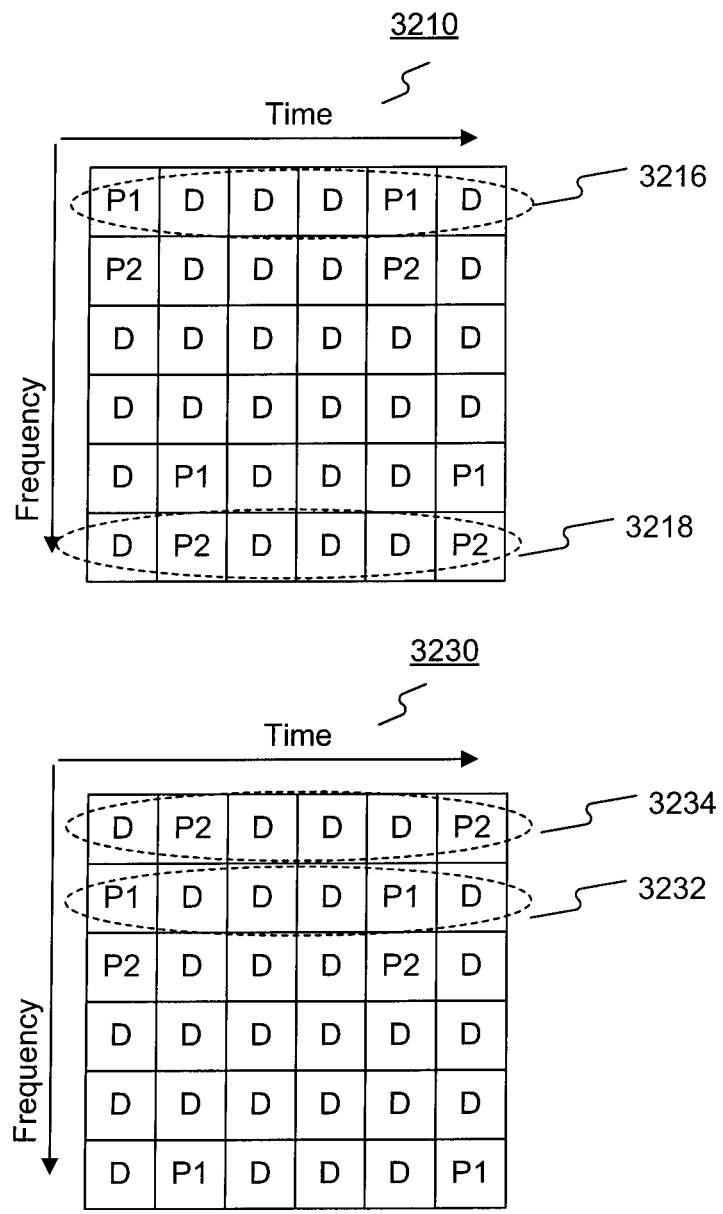

In exemplary embodiments, a given pilot pattern may be varied to generate a new pilot pattern, based on a cyclic shift of pilot symbols in a resource block representing the given pilot pattern. FIGS. 32A and 32B each show an exemplary, new pilot pattern generated by varying a given pilot pattern based on the cyclic shift, according to an exemplary embodiment. The given pilot pattern is represented by a resource block 3210. For example, the resource block 3210 is the same as the resource block 3110 shown in FIG. 31. The generated, new pilot patterns are represented by resource blocks 3220 and 3230 in FIGS. 32A and 32B, respectively.

In one exemplary embodiment, shown in FIG. 32A, a cyclic shift in time is performed on the pilot symbols in the resource block 3210 to generate the resource block 3220. For example, the pilot symbols allocated to a first time/OFDM symbol in the resource block 3210, indicated by a dashed circle 3212, are shifted to a second time/OFDM symbol in the resource block 3220, indicated by a dashed circle 3222. Also for example, the pilot symbols allocated to a last time/OFDM symbol in the resource block 3210, indicated by a dashed circle 3214, are shifted to the first time/OFDM symbol in the resource block 3220, indicated by a dashed circle 3224.

In one exemplary embodiment, shown in FIG. 32B, a cyclic shift in frequency is performed on the pilot symbols in the resource block 3210 to generate the resource block 3230. For example, the pilot symbols allocated to a first subcarrier in the resource block 3210, indicated by a dashed circle 3216, are shifted to a second subcarrier in the resource block 3230, indicated by a dashed circle 3232. Also for example, the pilot symbols allocated to a last subcarrier in the resource block 3210, indicated by a dashed circle 3218, are shifted to the first subcarrier in the resource block 3230, indicated by a dashed circle 3234.

In exemplary embodiments, either of a cyclic shift in time and a cyclic shift in frequency may be performed for a given pilot pattern to generate a new pilot pattern. Alternatively, a cyclic shift in time and a cyclic shift in frequency may be jointly performed for a given pilot pattern to generate a new pilot pattern.

Figure 33:
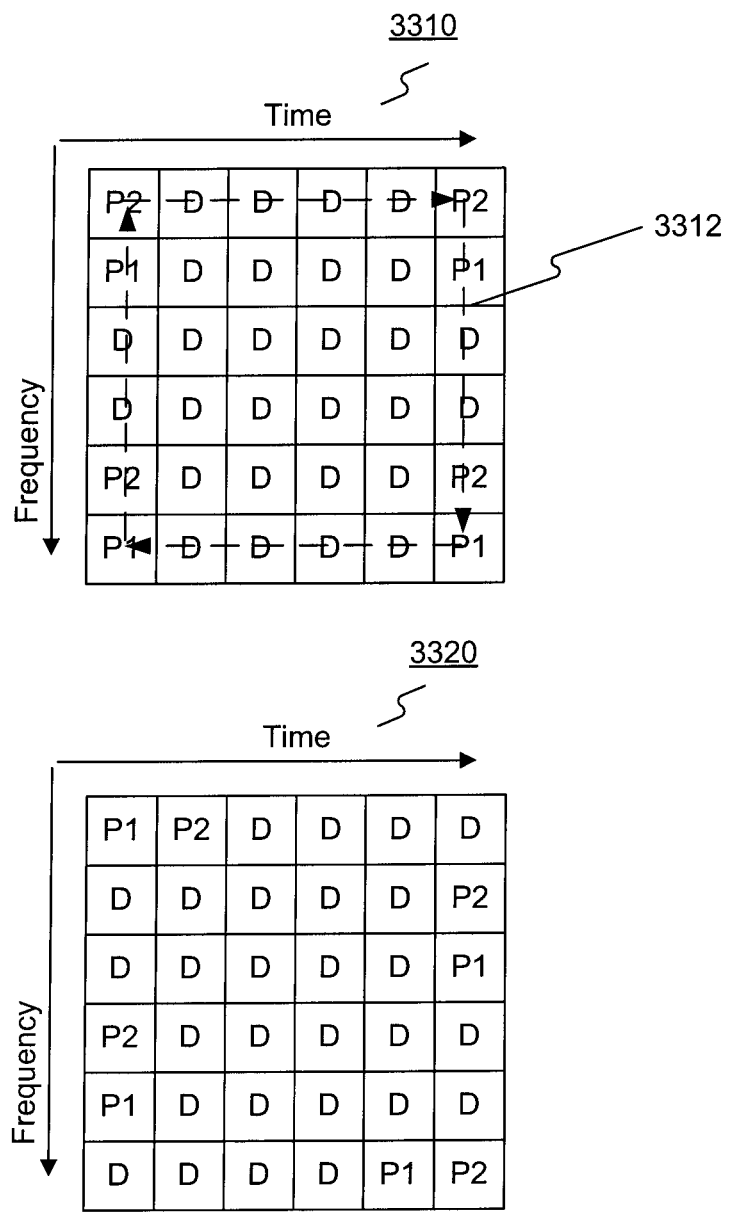
FIG. 33 shows an exemplary, new pilot pattern generated based on a given pilot pattern, according to an exemplary embodiment.

In exemplary embodiments, a given pilot pattern may be varied to generate a new pilot pattern, based on a rotational shift of pilot symbols in a resource block representing the given pilot pattern. FIG. 33 shows an exemplary, new pilot pattern generated by varying a given pilot pattern based on the rotational shift, according to an exemplary embodiment. The given and new pilot patterns are represented by resource blocks 3310 and 3320, respectively. The resource block 3310 includes a plurality of OFDM symbols, which further include a plurality of data symbols each represented by a small block with a letter "D" and a plurality of pilot symbols each represented by a small block with a letter P. For example, the small blocks with indexed letters "P1" and "P2" represent pilot symbols for first and second data streams, respectively. In the resource block 3310, each of the OFDM symbols is composed of one of the columns of data symbols "D" and any pilot symbols included therein.

In one exemplary embodiment, a rotational shift may be performed on the pilot symbols in the resource block 3310 with respect to a center of the resource block 3310, to generate the resource block 3320. For example, a rotational shift by one small block along a dashed loop 3312 may be performed on the pilot symbols in the resource block 3310. As a result, the new pilot pattern, represented by the resource block 3320, is generated.

As described above, a new pilot pattern may be generated based on a given pilot pattern by interchanging positions of pilot symbols in a resource block representing the given pilot pattern. In exemplary embodiments, this method may also be applied to a relatively small resource block.

Figure 34:
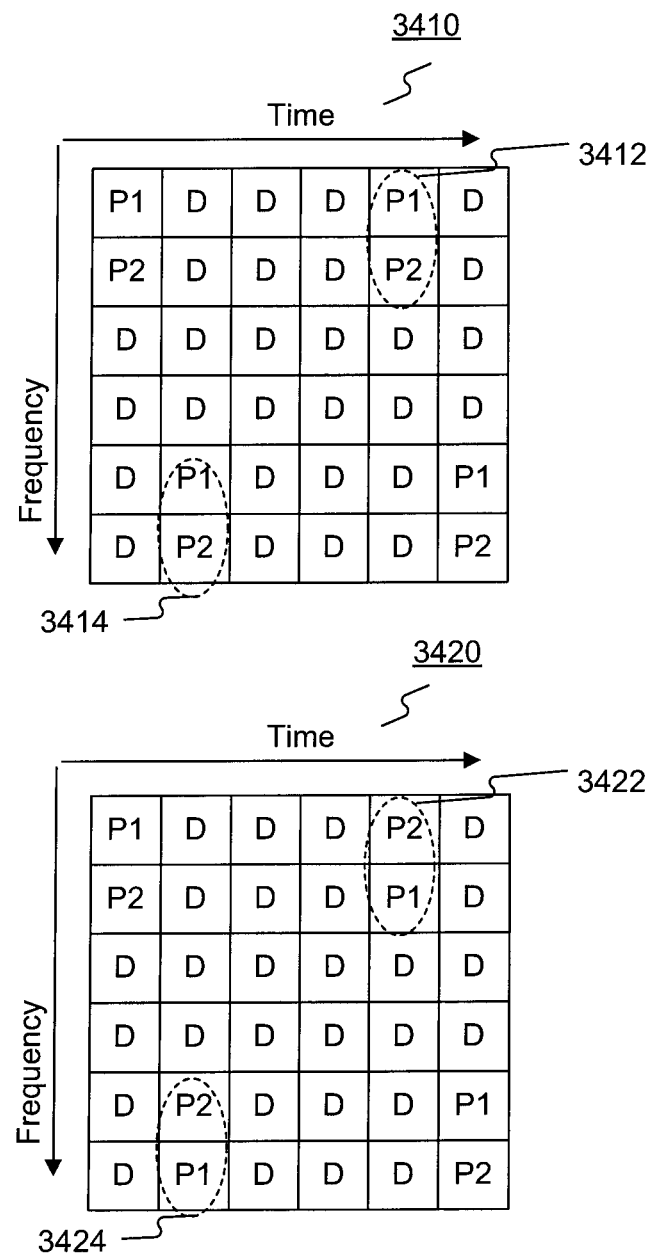
FIG. 34 shows an exemplary, new pilot pattern generated based on a given pilot pattern, according to an exemplary embodiment.

FIG. 34 shows an exemplary, new pilot pattern generated based on a given pilot pattern by interchanging positions of pilot symbols in a resource block representing the given pilot pattern, according to an exemplary embodiment. The given and new pilot patterns are represented by resource blocks 3410 and 3420, respectively. For example, the resource block 3410 is the same as the resource block 3110 shown in FIG. 31. The resource block 3410 includes a plurality of pilot clusters such as pilot clusters 3412 and 3414.

In exemplary embodiments, positions of the pilot symbols P1 and P2 in each of the pilot clusters 3412 and 3414 may be interchanged. For example, the pilot cluster 3412 in the resource block 3410 becomes a pilot cluster 3422 in the resource block 3420 after the interchanging. Also for example, the pilot cluster 3414 in the resource block 3410 becomes a pilot cluster 3424 in the resource block 3420 after the interchanging. As a result, the new pilot pattern, represented by the resource block 3420, is generated.

In exemplary embodiments, a new pilot pattern may be generated by combining two or more pilot patterns. The generated pilot pattern may be referred to as an interlaced pilot pattern. The two or more pilot patterns each may be a given pilot pattern, such as the pilot pattern represented by the resource block 3110 (FIG. 31), or a new pilot pattern generated based on methods consistent with the present invention. Different interlaced pilot patterns may correspond to different communication overheads.

Figure 35:
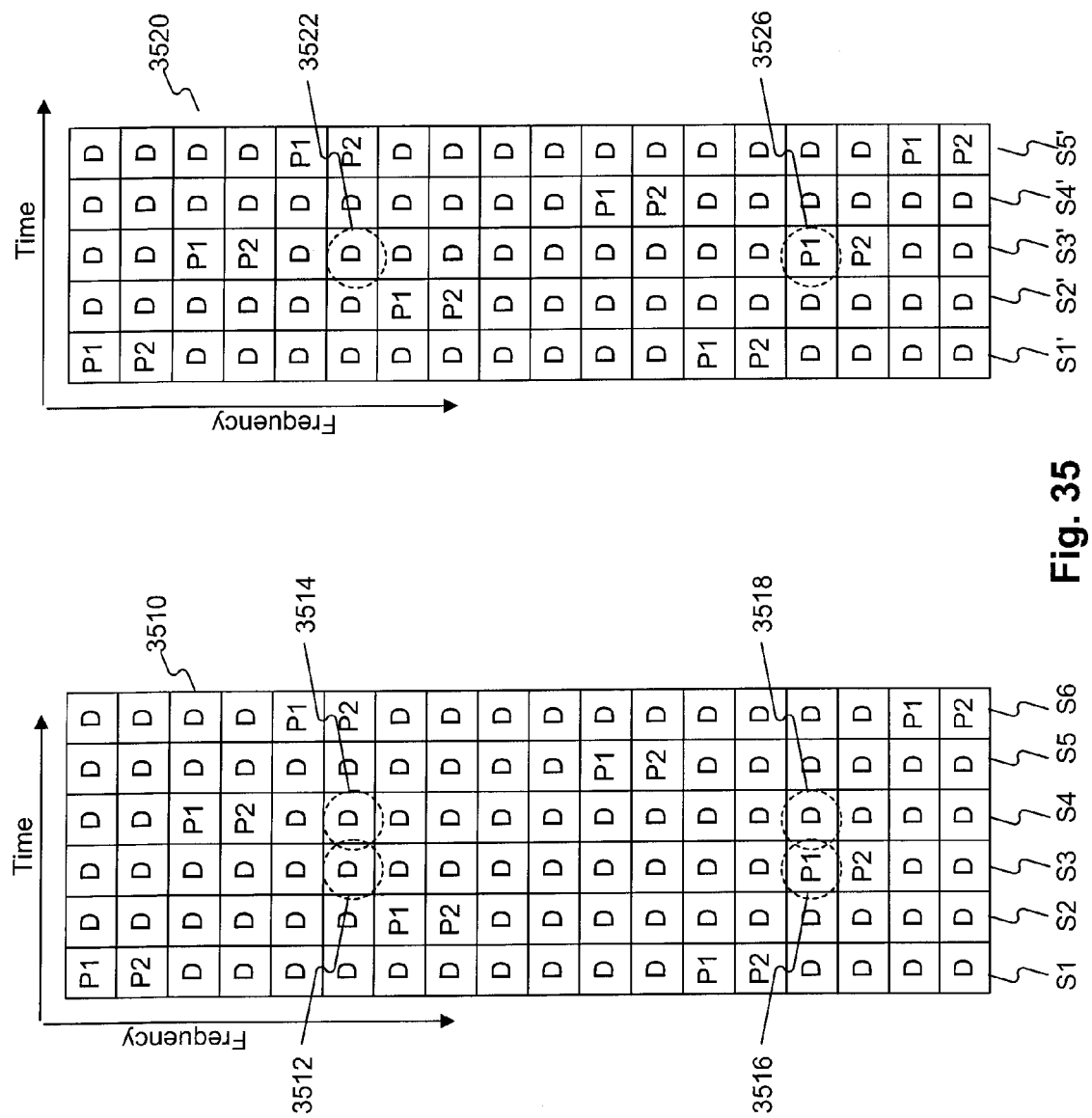
FIG. 35 shows an exemplary, new pilot pattern generated based on a given pilot pattern, according to an exemplary embodiment.

In exemplary embodiments, a new pilot pattern may be generated based on a given pilot pattern, wherein the new pilot pattern and the given pilot pattern may include a different number of OFDM symbols and/or a different number of subcarrier frequencies. FIG. 35 shows an exemplary, new pilot pattern generated based on a given pilot pattern, according to an exemplary embodiment. For example, the given and new pilot patterns are represented by resource blocks 3510 and 3520, respectively, and the new pilot pattern includes a reduced number of OFDM symbols.

In the illustrated embodiment, the resource block 3510 includes, e.g., six OFDM symbols S1, S2, . . . , S6, which further include a plurality of data symbols each represented by a small block with a letter "D" and a plurality of pilot symbols each represented by a small block with a letter P. For example, the small blocks with indexed letters "P1" and "P2" represent pilot symbols for first and second data streams, respectively. In the resource block 3510, each of the OFDM symbols is composed of one of the columns of data symbols "D" and any pilot symbols included therein.

In exemplary embodiments, ones of the OFDM symbols, e.g., the OFDM symbols S3 and S4, in the resource block 3510 may be superposed to generate the resource block 3520 to include a reduced number of OFDM symbols, such as OFDM symbols S1', S2', . . . , S5'. For example, OFDM symbols including a relatively smaller number of pilot symbols may be selected for the superposition, and extrapolation generally needs to be avoided. Also for example, superposition of data symbols, e.g., data symbols 3512 and 3514, in the resource block 3510 may result in a data symbol 3522 in the resource block 3520. Further for example, superposition of a pilot symbol and a data symbol, e.g., a pilot symbol 3516 and a data symbol 3518, in the resource block 3510 may result in a pilot symbol 3526 in the resource block 3520.

After the superposition, the OFDM symbols S1, S2, S5 and S6 in the resource block 3510 correspond to the OFDM symbols S1', S2', S4' and S5' in the resource block 3520, respectively. As a result, the new pilot pattern with a reduced number of OFDM symbols, represented by the resource block 3520, is generated.

Figure 36:
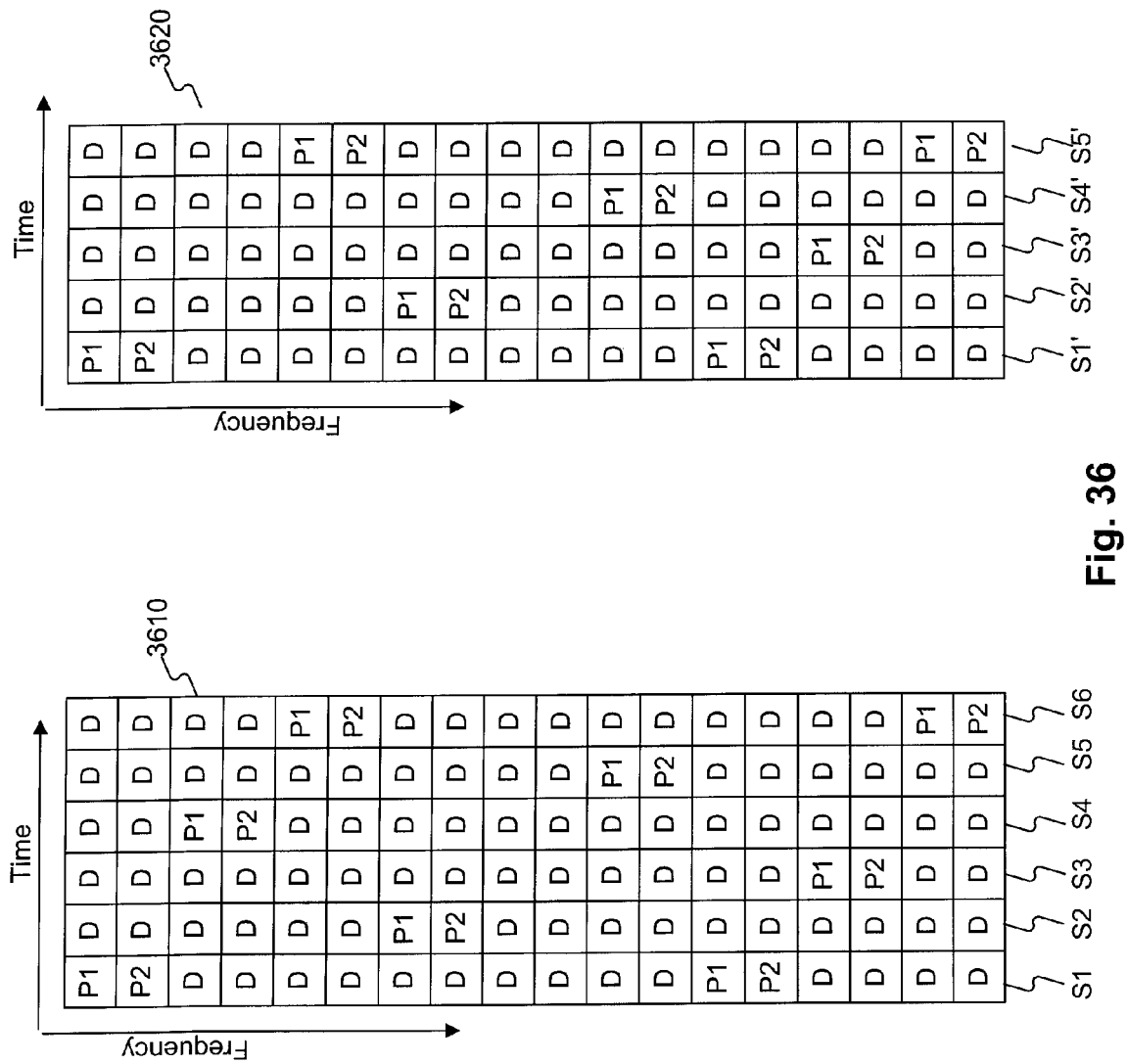
FIG. 36 shows an exemplary, new pilot pattern generated based on a given pilot pattern, according to an exemplary embodiment.

FIG. 36 shows an exemplary, new pilot pattern generated based on a given pilot pattern, according to an exemplary embodiment. For example, the given and new pilot patterns are represented by resource blocks 3610 and 3620, respectively, and the new pilot pattern includes a reduced number of OFDM symbols. In the illustrated embodiment, the resource block 3610 is the same as the resource block 3510 (FIG. 35).

In exemplary embodiments, one or more of the OFDM symbols, e.g., the OFDM symbol S4, in the resource block 3610 may be removed to generate the resource block 3620 to include a reduced number of OFDM symbols, such as OFDM symbols S1', S2', . . . , S5'. For example, an OFDM symbol including a relatively smaller number of pilot symbols may be removed, and extrapolation generally needs to be avoided.

After the removal, the OFDM symbols S1, S2, S3, S5 and S6 in the resource block 3610 correspond to the OFDM symbols S1', S2', S3', S4' and S5' in the resource block 3620, respectively. As a result, the new pilot pattern with a reduced number of OFDM symbols, represented by the resource block 3620, is generated.

Figure 37:
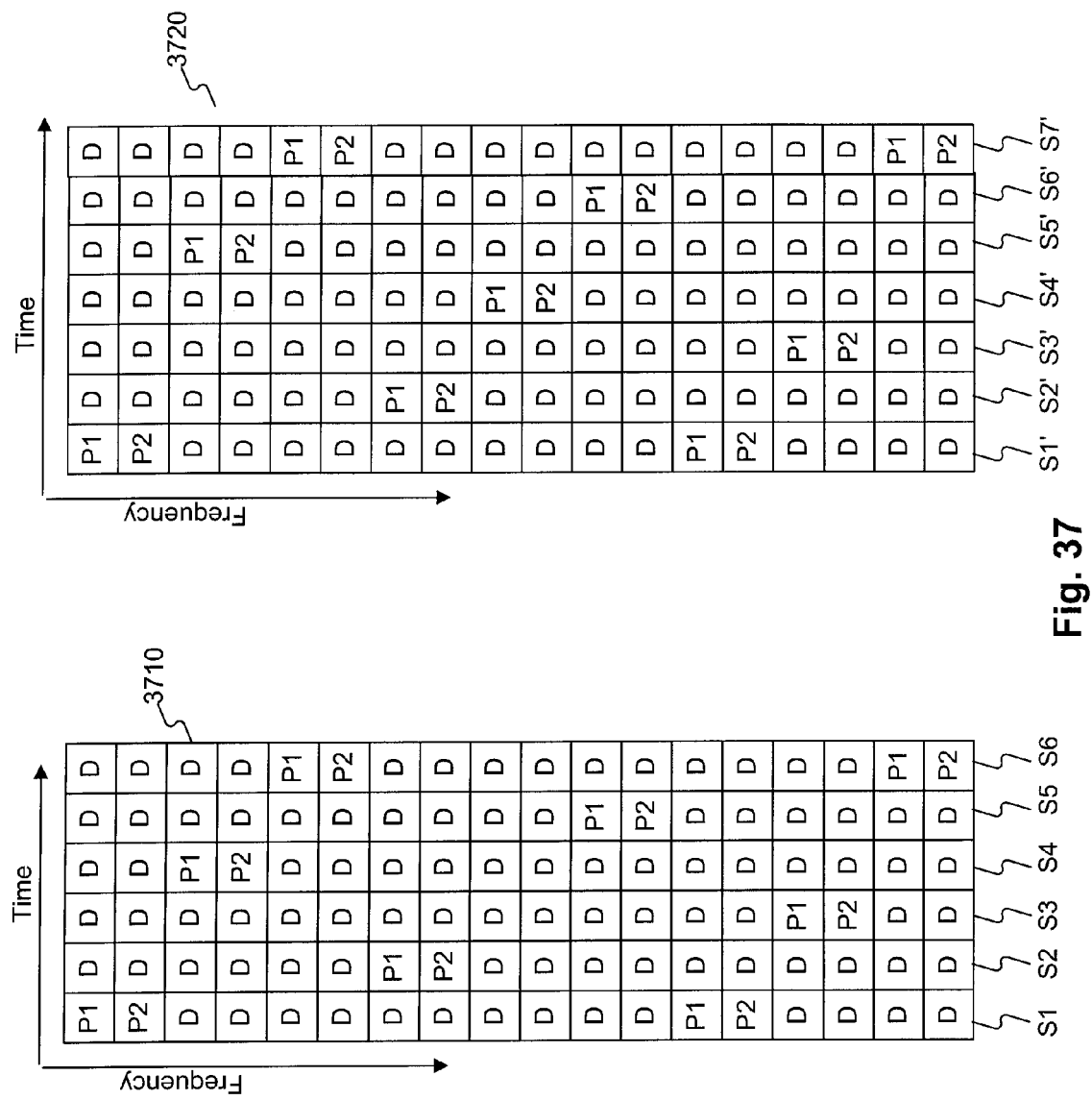
FIG. 37 shows an exemplary, new pilot pattern generated based on a given pilot pattern, according to an exemplary embodiment.

FIG. 37 shows an exemplary, new pilot pattern generated based on a given pilot pattern, according to an exemplary embodiment. For example, the given and new pilot patterns are represented by resource blocks 3710 and 3720, respectively, and the new pilot pattern includes an increased number of OFDM symbols. In the illustrated embodiment, the resource block 3710 is the same as the resource block 3510 (FIG. 35).

In exemplary embodiments, one or more OFDM symbols may be inserted into the resource block 3710 to generate the resource block 3720 to include an increased number of OFDM symbols, such as OFDM symbols S1', S2', . . . , S7'. For example, an inserted OFDM symbol may include pilot symbols to be allocated to subcarriers that have not carried pilot symbols in the resource block 3710. Also for example, an OFDM symbol including pilot symbols that may avoid or minimize extrapolation may be inserted. The inserted OFDM symbol may be at a boundary or interior of the resource block 3710.

For example, the OFDM symbol S4' may be inserted to generate the resource block 3720. After the insertion, the OFDM symbols S1, S2, S3, S4, S5 and S6 in the resource block 3710 correspond to the OFDM symbols S1', S2', S3', S5', S6', and S7' in the resource block 3720, respectively. As a result, the new pilot pattern with an increased number of OFDM symbols, represented by the resource block 3720, is generated.

Figure 38:
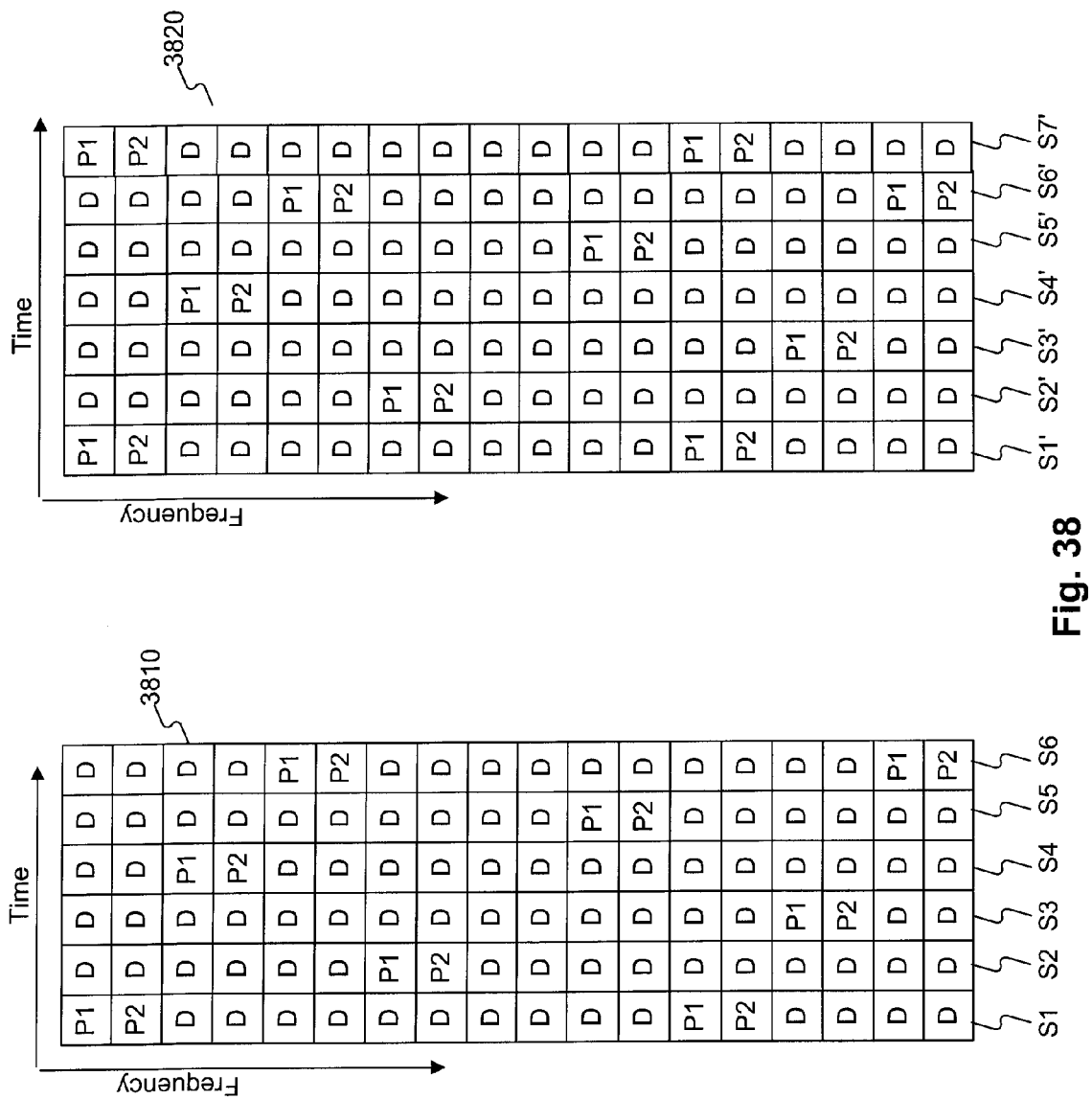
FIG. 38 shows an exemplary, new pilot pattern generated based on a given pilot pattern, according to an exemplary embodiment.

FIG. 38 shows an exemplary, new pilot pattern generated based on a given pilot pattern, according to an exemplary embodiment. For example, the given and new pilot patterns are represented by resource blocks 3810 and 3820, respectively, and the new pilot pattern includes an increased number of OFDM symbols. In the illustrated embodiment, the resource block 3810 is the same as the resource block 3510 (FIG. 35).

In exemplary embodiments, one or more of the OFDM symbols in the resource block 3810 may be repeated, and be appended to the OFDM symbols to generate the resource block 3820 to include an increased number of OFDM symbols, such as OFDM symbols S1', S2', . . . , S7'. For example, the OFDM symbol S1 in the resource block 3810 may be repeated and appended to the resource block 3810 to generate the resource block 3820. As a result, the new pilot pattern with an increased number of OFDM symbols, represented by the resource block 3820, is generated.

In exemplary embodiments, a new pilot pattern may be generated by changing a size of a resource block representing a given pilot pattern in the subcarrier or the frequency domain, i.e., changing a number of subcarriers or frequencies in the resource block, similar to the description above in connection with reducing or increasing a number of OFDM symbols in a resource block representing a given pilot pattern. Furthermore, a new pilot pattern may be generated by changing both a number of OFDM symbols and a number of subcarriers in a resource block representing a given pilot pattern.

In exemplary embodiments, pilot patterns with a variable pilot overhead may be generated for long delay spread channels. FIGS. 39-42 show exemplary pilot patterns for long delay spread channels, according to exemplary embodiments. The pilot patterns are represented by resource blocks. For illustrative purposes only, it is assumed that the resource blocks each include eighteen subcarriers and six OFDM symbols, and are designed for data transmission in an OFDM based communication system transmitting first and second data streams.

Figure 39:
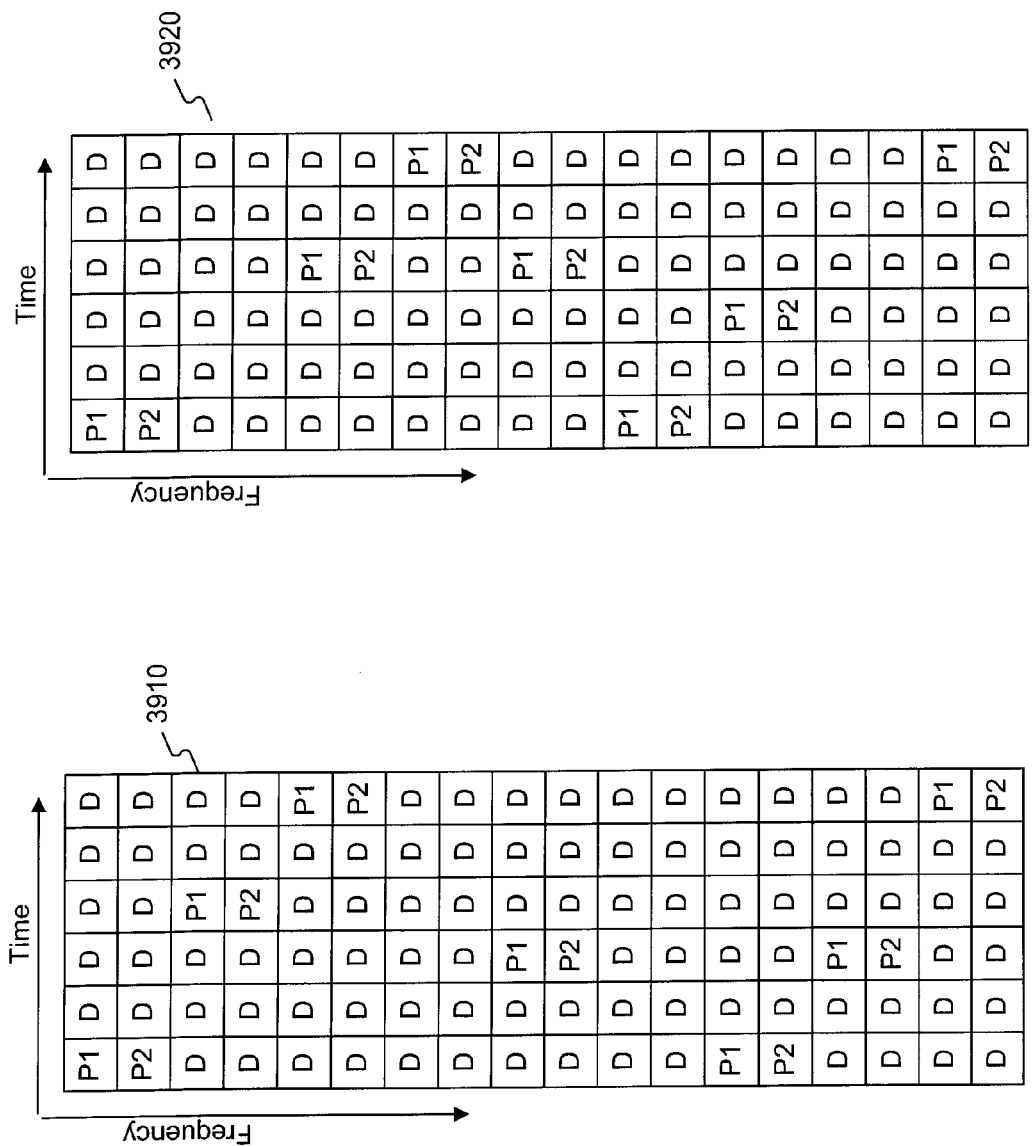
FIGS. 39-42 show exemplary pilot patterns for long delay spread channels, according to exemplary embodiments.
Figure 40:
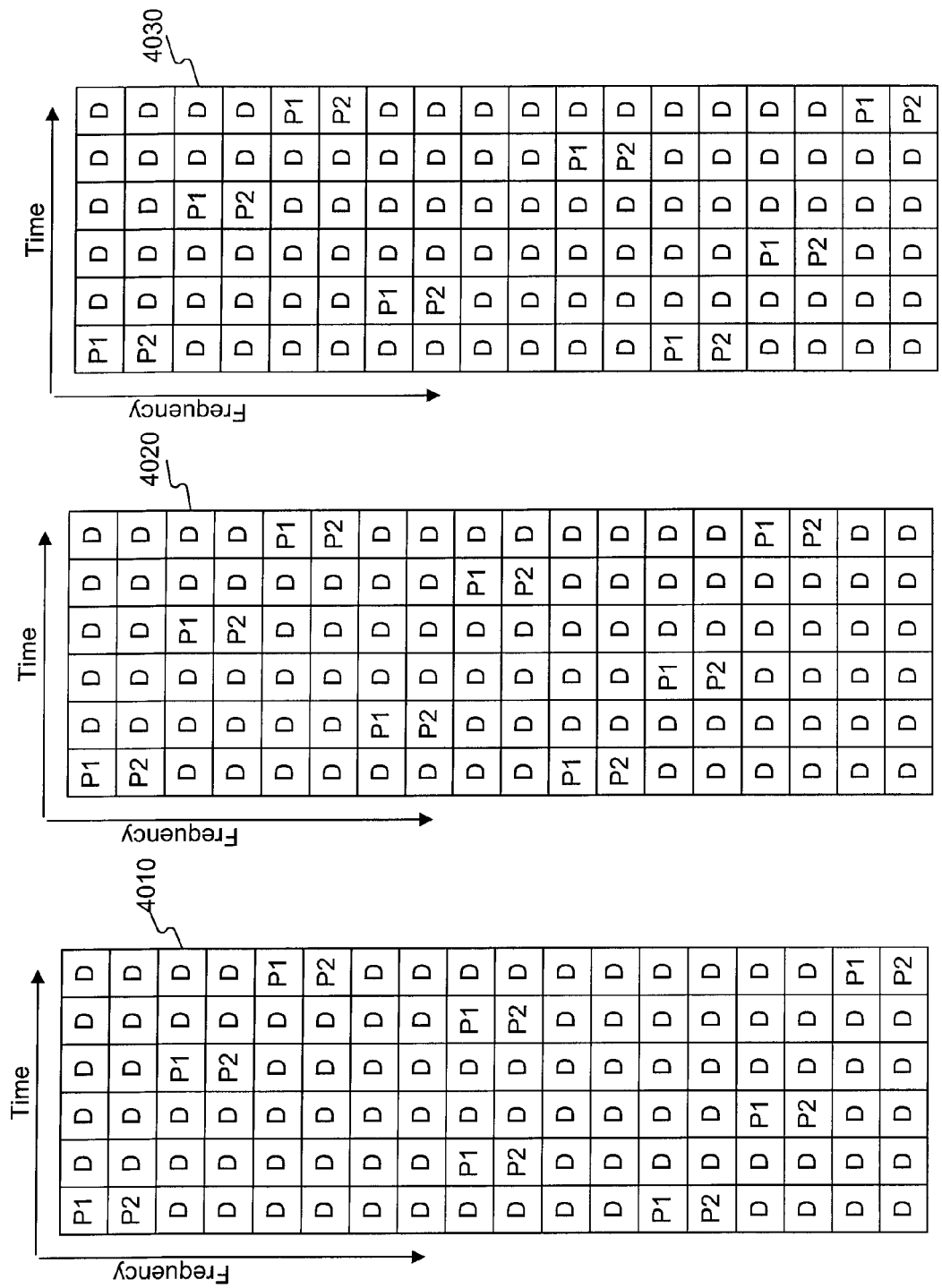
Figure 41:
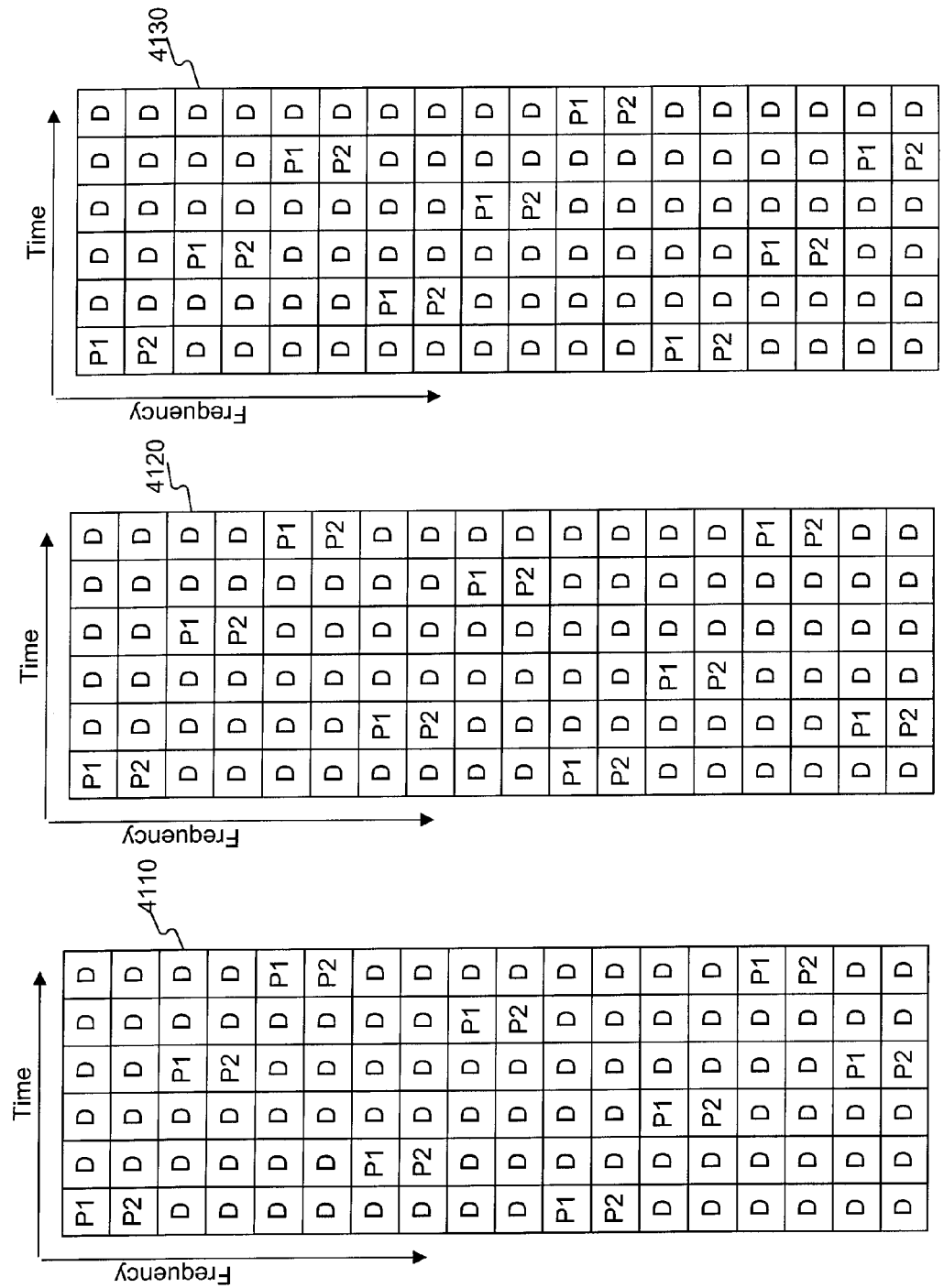
Figure 42:
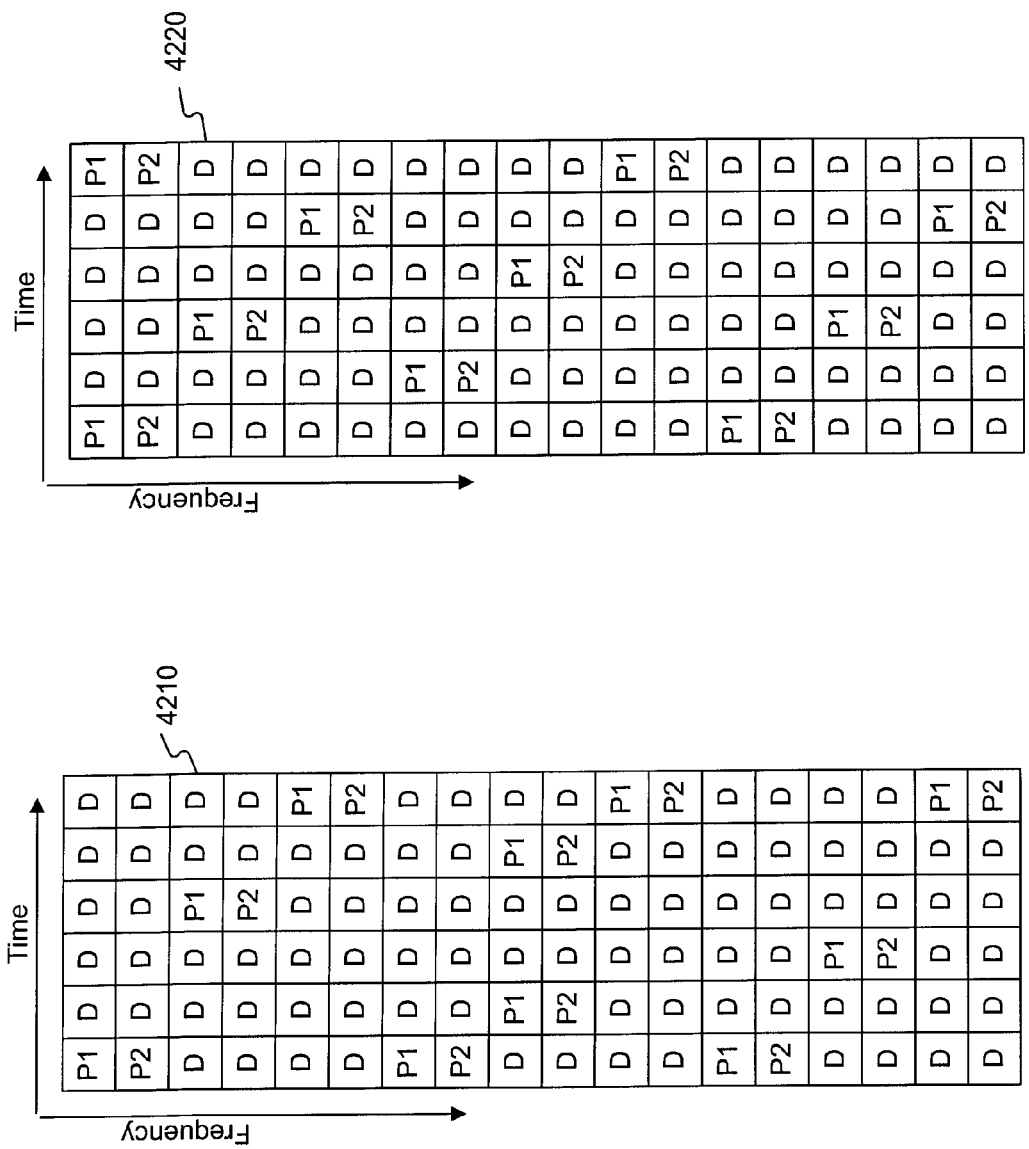

For example, resource blocks 3910 and 3920 shown in FIG. 39 each have a pilot overhead of 12.96% approximately. Also for example, resource blocks 4010, 4020, and 4030 shown in FIG. 40 each have a pilot overhead of 14.81% approximately. Further for example, resource blocks 4110, 4120, and 4130 shown in FIG. 41 each have a pilot overhead of 16.67% approximately. As another example, resource blocks 4210 and 4220 shown in FIG. 42 each have a pilot overhead of 18.5% approximately.

In exemplary embodiments, pilot patterns for long delay spread channels may be generated based on different methods or rules described above. For example, data symbols may be allocated in a resource block to form as many pairs of data symbols as possible, which may support data-pair based permutation and the SFBC application. Pilot symbols may also be allocated to form as many pairs of pilot symbols as possible, and the pairs of pilot symbols may be distributed in the resource block as far apart in frequency as possible. In addition, each OFDM symbol may contain an approximately equal power for each data stream.

While embodiments have been described based on two or four data streams, the invention is not so limited. It may be practiced with equal effectiveness with greater or fewer data streams.

Other embodiments of the invention will be apparent to those skilled in the art from consideration of the specification and practice of the invention disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for generating a pilot pattern for data to be transmitted in an orthogonal frequency-division multiplexing (OFDM) based communication system including a transmitter, the method comprising:

allocating, by the transmitter, pilot symbols for a plurality of data streams to form a plurality of pilot clusters in the pilot pattern, wherein each of the pilot clusters includes ones of the pilot symbols, the ones of the pilot symbols being for respectively different ones of the data streams, wherein the pilot pattern is a first pilot pattern represented by a resource block and the method further comprising:
moving, by the transmitter, at least one of the pilot clusters from a first location in the resource block to a second location in the resource block to generate a second pilot pattern, the first and second locations being symmetrical in time; and
generating, by the transmitter, a third pilot pattern based on the first and second pilot patterns.

2. The method of claim 1, wherein the allocating further comprises:
allocating, by the transmitter, a moderate number of pilot symbols for the data streams.

3. The method of claim 1, wherein the allocating further comprises:
allocating, by the transmitter, a low number of pilot symbols for the data streams.

4. The method of claim 1, wherein the pilot pattern is represented by a resource block, the allocating further comprising:
allocating, by the transmitter, ones of the pilot symbols to boundary subcarriers in the resource block.

5. The method of claim 1, wherein the pilot pattern is represented by a resource block, the allocating further comprising:
allocating, by the transmitter, a first one of the pilot clusters to a corner of the resource block.

6. The method of claim 1, wherein the pilot pattern is a first pilot pattern, the method further comprising:
interchanging, by the transmitter, positions of first and second pilot symbols in at least one of the pilot clusters in the first pilot pattern to generate a second pilot pattern.

7. The method of claim 1, wherein the communication system is a single-user multi-input and multi-output (MIMO) system including a single receiver, the method further comprising:
allocating, by the transmitter, the pilot symbols for the plurality of data streams, the data streams being transmitted to the single receiver.

8. The method of claim 1, wherein the communication system is a multi-user multi-input and multi-output (MIMO) system including multiple receivers, the method further comprising:
allocating, by the transmitter, the pilot symbols for the plurality of data streams, the data streams being transmitted to the multiple receivers.

9. The method of claim 1, wherein the pilot pattern is a first pilot pattern, the method further comprising:
generating, by the transmitter, a single-stream pilot pattern for a single data stream from the plurality of data streams based on the first pilot pattern.

10. The method of claim 9, wherein the generating comprises:
using, by the transmitter, the pilot symbols for a first one of the plurality of data streams in the first pilot pattern as pilot symbols for the single data stream; and
replacing, by the transmitter, the pilot symbols for remaining ones of the data streams in the first pilot pattern with data symbols, to generate the single-stream pilot pattern.

11. The method of claim 1, wherein the allocating comprises:
allocating, by the transmitter, the pilot symbols for a first one of the data streams to distribute in different OFDM symbols.

12. A method for generating a pilot pattern for data to be transmitted in an orthogonal frequency-division multiplexing (OFDM) based communication system including a transmitter, the method comprising:
allocating, by the transmitter, first and second pilot symbols for first and second ones of a plurality of data streams, respectively, to a same subcarrier of the communication system, the first and second pilot symbols corresponding to a same time,
wherein the pilot pattern is represented by first and second resource blocks, the allocating further comprising:
allocating, by the transmitter, third and fourth pilot symbols to first and second boundary times in the first and second resource blocks, respectively, the third and fourth pilot symbols being for third and fourth ones of the plurality of data streams; and
symmetrically shifting, by the transmitter, the third and fourth pilot symbols from the boundary times to intermediate times in the first and second resource blocks respectively.

13. The method of claim 12, further comprising:
allocating, by the transmitter, a moderate number of pilot symbols for the plurality of data streams.

14. The method of claim 12, further comprising:
allocating, by the transmitter, a low number of pilot symbols for the plurality of data streams.

15. The method of claim 12, further comprising:
multiplying, by the transmitter, the first pilot symbol with a first code; and
multiplying, by the transmitter, the second pilot symbol with a second code,
wherein the first and second codes are mutually orthogonal codes.

16. The method of claim 12, further comprising:
multiplying, by the transmitter, the first pilot symbol with a first Walsh code; and
multiplying, by the transmitter, the second pilot symbol with a second Walsh code,
wherein the first and second Walsh codes are mutually orthogonal.

17. The method of claim 12, wherein the pilot pattern is represented by first and second resource blocks, the allocating further comprising:
allocating, by the transmitter, the first pilot symbol to a boundary subcarrier in the first resource block; and
allocating, by the transmitter, the second pilot symbol to a boundary subcarrier in the second resource block,
wherein the boundary subcarrier in the first resource block and the boundary subcarrier in the second resource block correspond to the same subcarrier of the communication system.

18. The method of claim 12, wherein the communication system is a single-user multi-input and multi-output (MIMO) system including a single receiver, the method further comprising:
allocating, by the transmitter, pilot symbols for the plurality of data streams, the plurality of data streams being transmitted to the single receiver.

19. The method of claim 12, wherein the communication system is a multi-user multi-input and multi-output (MIMO) system including multiple receivers, the method further comprising:
allocating, by the transmitter, pilot symbols for the plurality of data streams, the plurality of data streams being transmitted to the multiple receivers.

20. The method of claim 12, wherein the pilot pattern is a first pilot pattern, the method further comprising:
   generating, by the transmitter, a single-stream pilot pattern for a single data stream from the plurality of data streams based on the first pilot pattern.

21. A method for generating a new pilot pattern for data to be transmitted in an orthogonal frequency-division multiplexing (OFDM) based communication system including a transmitter, the method comprising:
   generating, by the transmitter, the new pilot pattern based on a given pilot pattern including a plurality of pilot symbols, wherein the given pilot pattern is represented by a resource block including a plurality of OFDM symbols, the generating comprising:
   repeating, by the transmitter, one of the plurality of OFDM symbols in the resource block; and
   appending, by the transmitter, the repeated one of the plurality of OFDM symbols to the plurality of OFDM symbols to generate the new pilot pattern.

22. The method of claim 21, wherein the given pilot pattern is represented by a resource block including a plurality of OFDM symbols, the generating comprising:
   inserting, by the transmitter, one or more OFDM symbols into the resource block to generate the new pilot pattern.

23. The method of claim 21, wherein the given pilot pattern is represented by a resource block, the generating comprising:
   changing, by the transmitter, a size of the resource block to generate the new pilot pattern.

24. The method of claim 21, wherein the given pilot pattern is represented by a resource block including a plurality of subcarriers, the generating comprising:
   inserting, by the transmitter, one or more subcarriers into the resource block to generate the new pilot pattern.

25. A method for generating a new pilot pattern for data to be transmitted in an orthogonal frequency-division multiplexing (OFDM) based communication system including a transmitter, the method comprising:
   generating, by the transmitter, the new pilot pattern based on a given pilot pattern including a plurality of pilot symbols, wherein the given pilot pattern is represented by a resource block including a plurality of OFDM symbols, the generating comprising:
   removing, by the transmitter, at least one of the plurality of OFDM symbols in the resource block to generate the new pilot pattern.

26. A method for generating a new pilot pattern for data to be transmitted in an orthogonal frequency-division multiplexing (OFDM) based communication system including a transmitter, the method comprising:
   generating, by the transmitter, the new pilot pattern based on a given pilot pattern including a plurality of pilot symbols, wherein the given pilot pattern is represented by a resource block including a plurality of subcarriers, the generating comprising:
   repeating, by the transmitter, one of the plurality of subcarriers in the resource block; and
   appending, by the transmitter, the repeated one of the plurality of subcarriers to the plurality of subcarriers to generate the new pilot pattern.

* * * * *